United States Patent
Seki et al.

(10) Patent No.: US 10,564,582 B2
(45) Date of Patent: Feb. 18, 2020

(54) ROTATING MEMBER CONTROL DEVICE, CONVEYING DEVICE, AND IMAGE FORMING APPARATUS

(71) Applicants: Takafumi Seki, Kanagawa (JP); Hiromichi Matsuda, Kanagawa (JP)

(72) Inventors: Takafumi Seki, Kanagawa (JP); Hiromichi Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 15/621,342

(22) Filed: Jun. 13, 2017

(65) Prior Publication Data

US 2017/0364011 A1 Dec. 21, 2017

(30) Foreign Application Priority Data

Jun. 20, 2016 (JP) .................................. 2016-121888
Jun. 6, 2017 (JP) .................................. 2017-111433

(51) Int. Cl.
*G03G 15/00* (2006.01)
*G03G 15/16* (2006.01)
(Continued)

(52) U.S. Cl.
CPC ..... *G03G 15/5008* (2013.01); *G03G 15/1615* (2013.01); *G03G 15/505* (2013.01);
(Continued)

(58) Field of Classification Search
CPC ........... G03G 15/5008; G03G 15/6558; G03G 15/505; G03G 15/1615;
(Continued)

(56) References Cited

U.S. PATENT DOCUMENTS 6,898,386 B2 5/2005 Takigawa
2004/0184831 A1* 9/2004 Isobe ................. G03G 15/0194
399/66
(Continued)

FOREIGN PATENT DOCUMENTS

JP 3901647 4/2007
JP 2013242380 A * 12/2013
(Continued)

OTHER PUBLICATIONS

Machine translation of JP2013242380 (Year: 2013).*

*Primary Examiner* — Matthew G Marini
(74) *Attorney, Agent, or Firm* — IPUSA, PLLC

(57) ABSTRACT

A rotating member control device that controls a first rotating member and a second rotating member to convey a sheet includes a processor configured to execute a program to implement processes of controlling the first rotating member and the second rotating member to come into contact or be separated from each other and acquiring a value that corresponds to or is proportional to a driving torque of a first driving unit that rotationally drives the first rotating member. The processor acquires the value upon separation when the first rotating member and the second rotating member are separated from each other and upon conveyance when the sheet is held between and conveyed by the first rotating member and the second rotating member. The processor further sets a rotational speed of the second rotating member such that the value acquired upon separation and the value acquired upon conveyance become equal.

12 Claims, 20 Drawing Sheets

(51) Int. Cl.
  *B65H 7/14*     (2006.01)
  *H04N 1/00*     (2006.01)

(52) U.S. Cl.
  CPC ..... *G03G 15/6558* (2013.01); *H04N 1/00602* (2013.01); *B65H 7/14* (2013.01); *G03G 2215/00599* (2013.01); *G03G 2215/00679* (2013.01); *G03G 2215/00945* (2013.01)

(58) Field of Classification Search
  CPC .......... G03G 2215/00679; G03G 2215/00599; G03G 2215/00945; B65H 7/14
  See application file for complete search history.

(56) References Cited

U.S. PATENT DOCUMENTS

| | | | |
|---|---|---|---|
| 2009/0057994 A1* | 3/2009 | Kondo | B65H 7/02 271/228 |
| 2011/0293307 A1* | 12/2011 | Ogata | G03G 15/161 399/66 |
| 2016/0216649 A1 | 7/2016 | Matsuda et al. | |

FOREIGN PATENT DOCUMENTS

| | | |
|---|---|---|
| JP | 2014-038241 | 2/2014 |
| JP | 2015-176003 | 10/2015 |

* cited by examiner

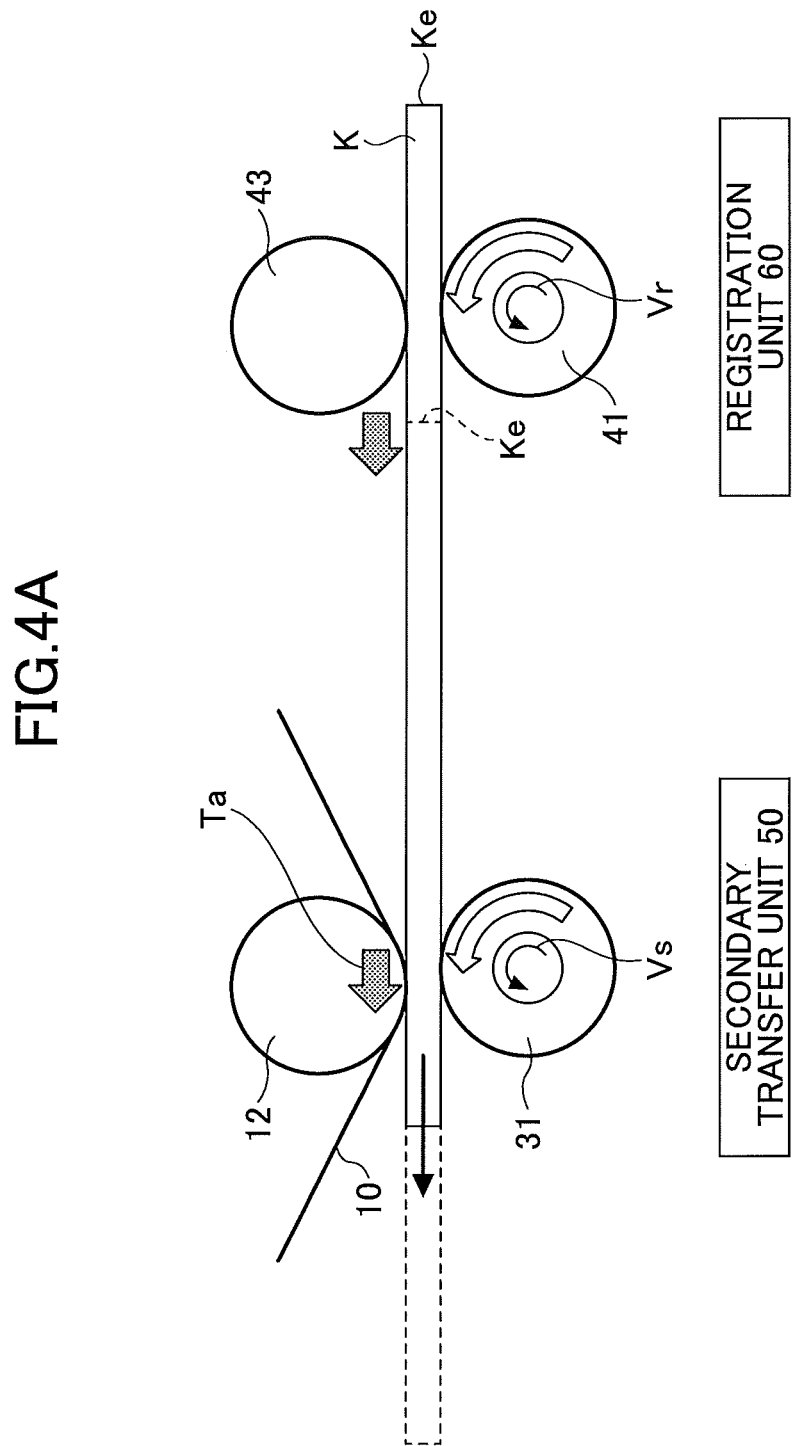

ROTATING MEMBER CONTROL DEVICE, CONVEYING DEVICE, AND IMAGE FORMING APPARATUS

CROSS-REFERENCE TO RELATED APPLICATIONS

The present application claims priority under 35 U.S.C. § 119 to Japanese Patent Application No. 2016-121888 filed on Jun. 20, 2016 and Japanese Patent Application No. 2017-111433 filed on Jun. 6, 2017, the entire contents of which are incorporated herein by reference.

BACKGROUND OF THE INVENTION

1. Field of the Invention

The present invention relates to a rotating member control device, a conveying device, and an image forming apparatus.

2. Description of the Related Art

Image forming apparatuses may have a mechanism including a motor that rotates at a constant speed to drive a secondary transfer roller and an intermediate transfer belt.

In such a mechanism, when the surface speed of the intermediate transfer belt and the surface speed of the secondary transfer roller are different, torque interference occurs between the intermediate transfer belt and the secondary transfer roller to maintain a constant speed constant. Such torque interference influences driving of the intermediate transfer belt and may be a factor causing color shifting when forming an image on the intermediate transfer belt.

In this respect, for example, a technique is known for improving speed control accuracy using a sensor that reads a speed detection pattern formed on the intermediate transfer belt near a contacting portion of the intermediate transfer belt and the secondary transfer roller (see, e.g., Japanese Patent No. 3901647). Also, a speed control technique is known that involves adjusting a first driving torque of an image carrier while conveying a transfer medium (e.g., paper) with a conveying roller and a transfer unit, which transfers a toner image from the image carrier to the transfer medium, and a second driving torque of the image carrier while conveying the transfer medium with the transfer unit such that their difference will be zero (see, e.g., Japanese Unexamined Patent Publication No. 2014-38241).

In the former technique described above, speed control accuracy may be compromised in the case where contact pressure of the contacting portion changes due to variations in the type of recording paper used or changes in the diameter and/or shape of the secondary transfer roller caused by the temperature or aging, for example. In the latter technique described above, although torque interference between the transfer unit and the conveying roller can be controlled, influences of the conveying roller on the surface speed of the intermediate transfer belt cannot be eliminated. As such, it is difficult to adequately stabilize operations for driving the intermediate transfer belt.

SUMMARY OF THE INVENTION

An aspect of the present invention is directed to providing a technique for stably driving a rotating member.

According to one embodiment of the present invention, a rotating member control device is provided that is configured to control a first rotating member and a second rotating member to convey a sheet. The rotating member control device includes a memory storing a program and a processor configured to execute the program to implement processes of controlling the first rotating member and the second rotating member to come into contact or be separated from each other and acquiring a value that corresponds to or is proportional to a driving torque of a first driving unit that rotationally drives the first rotating member. The processor acquires the value upon separation when the first rotating member and the second rotating member are separated from each other and upon conveyance when the sheet is held between the first rotating member and the second rotating member and is conveyed by the first rotating member and the second rotating member. The processor further implements a process of setting a rotational speed of the second rotating member such that the value acquired upon separation and the value acquired upon conveyance become equal.

BRIEF DESCRIPTION OF THE DRAWINGS

FIGS. 4A and 4B are diagrams illustrating interference torque generated between a secondary transfer motor and a registration motor;

DESCRIPTION OF THE EMBODIMENTS

In the following, embodiments of the present invention are described with reference to the accompanying drawings.

First Embodiment

Figure 1A:
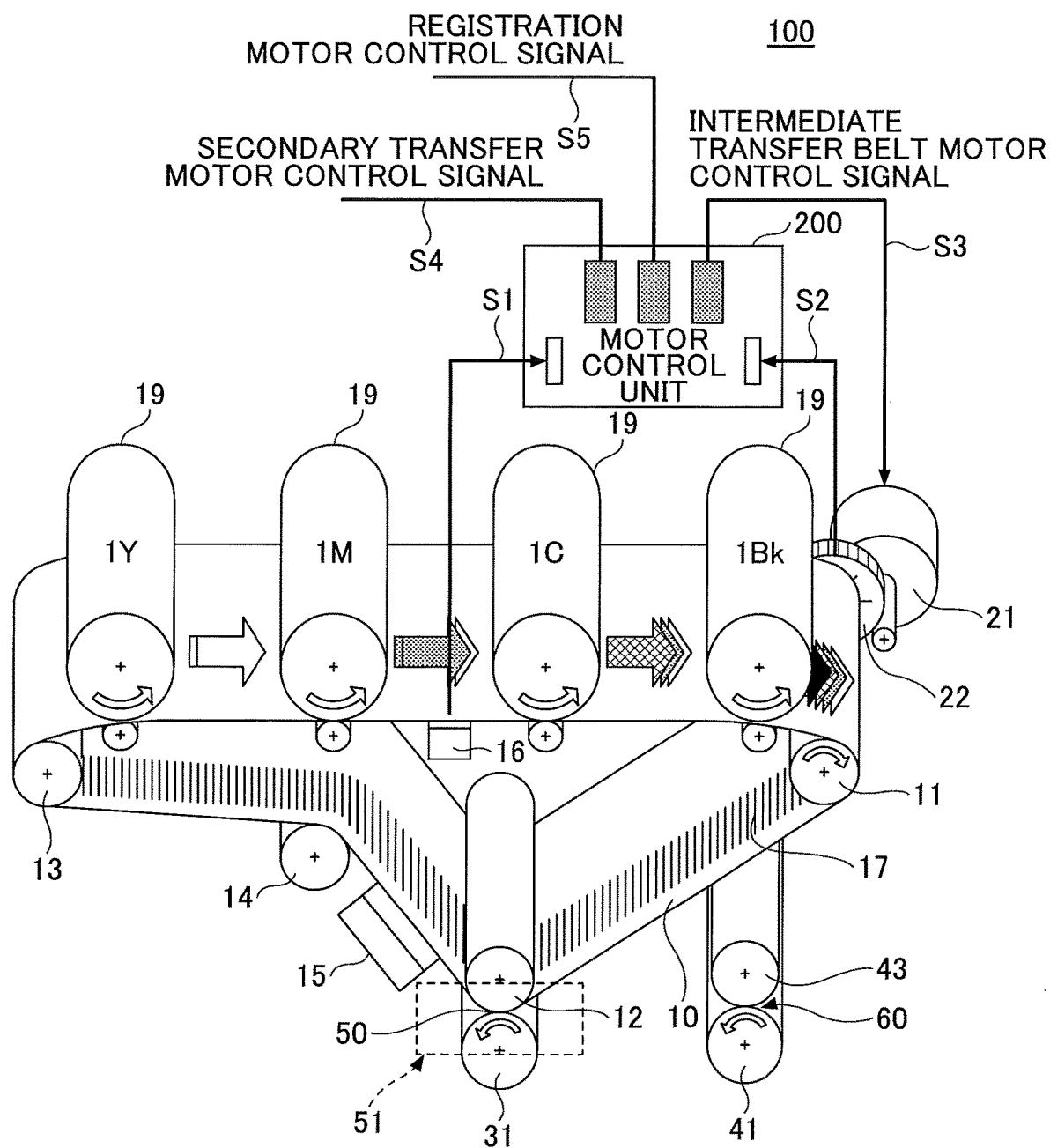
FIGS. 1A-1C are diagrams illustrating a conveying device according to a first embodiment of the present invention.
Figure 1B:
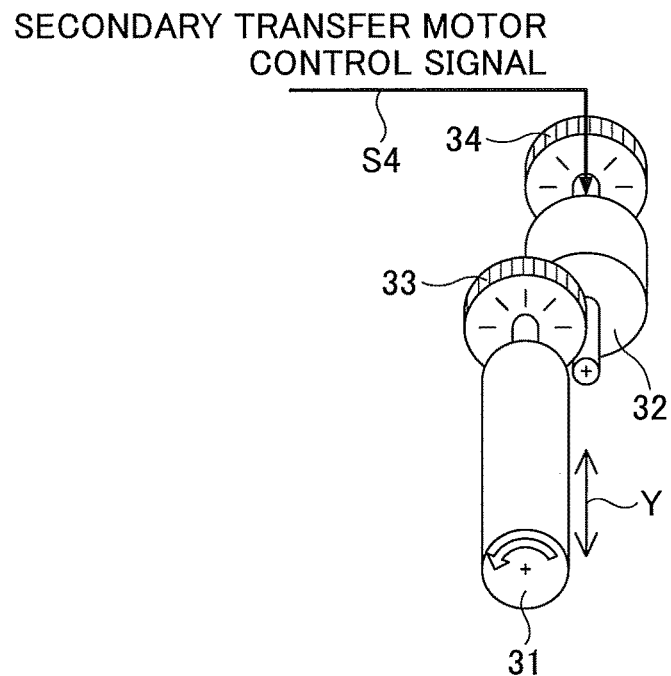
Figure 1C:
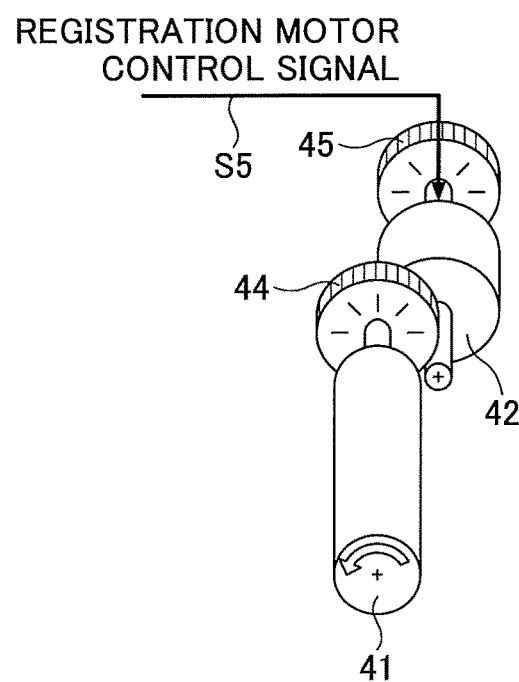

FIGS. 1A-1C are diagrams illustrating an example configuration of a conveying device 100 according to a first embodiment of the present invention.

The conveying device 100 conveys a recording medium such as a sheet and is installed in an image forming apparatus as described below. FIG. 1A illustrates the overall configuration of the conveying device 100, FIG. 1B illustrates the configuration of a portion around a secondary transfer roller 31, and FIG. 1C illustrates the configuration of a portion around a registration roller 41.

The conveying device 100 according to the present embodiment includes an intermediate transfer belt 10, an intermediate transfer roller 11, an opposing roller 12 of the secondary transfer roller 31, a driven roller 13, a tension roller 14, a belt cleaning device 15, and a scale sensor 16. An encoder pattern 17 is formed on the intermediate transfer belt 10.

Also, the conveying device 100 according to the present embodiment includes an intermediate transfer motor 21, roller encoders 22, 33, and 43, motor encoders 34 and 44, the secondary transfer roller 31, a secondary transfer motor 32, the registration roller 41, a registration motor 42, and an opposing roller 43 of the registration roller 41.

Further, the conveying device 100 according to the present embodiment includes a motor control unit 200 that performs control operations for controlling the surface speed of the intermediate transfer belt 10 to be constant.

Note that in the present embodiment, the intermediate transfer belt 10 corresponds to a first rotating member, the secondary transfer roller 31 corresponds to a second rotating member, and the registration roller 41 corresponds to a third rotating member.

In the conveying device 100 according to the present embodiment, the intermediate transfer belt 10 is an endless belt stretched around a plurality of stretching rollers arranged within a belt loop formed by the intermediate transfer belt 10. When the intermediate transfer roller 11, which constitutes one of the stretching rollers, is rotationally driven, the intermediate transfer belt 10 is endlessly moved around the stretching rollers. The intermediate transfer roller 11 is connected to the intermediate transfer motor 21 corresponding to a drive source via a speed reduction mechanism. The speed reduction mechanism is configured by meshing a small gear on a rotating shaft of the intermediate transfer motor 21 with a large gear on a rotating shaft of the intermediate transfer roller 11.

In the present embodiment, a belt encoder system is used to detect the surface speed of the intermediate transfer belt 10. That is, the encoder pattern 17 is formed on the front surface or the back surface of the intermediate transfer belt 10, and the surface speed of the intermediate transfer belt 10 is detected by having the scale sensor 16 read the encoder pattern 17.

Note that although the scale sensor 16 is arranged in the middle between the driven roller 13 and the intermediate transfer roller 11 in the example illustrated in FIG. 1A, the present invention is not limited thereto. That is, the scale sensor 16 may be able to accurately detect the surface speed of the intermediate transfer belt 10 as long as it is arranged on a flat portion. When the scale sensor 16 is installed on a non-flat portion, such as a rotating shaft, for example, the scale sensor 16 may not be able to accurately detect the surface speed of the intermediate transfer belt 10 due to influences of the curvature of the rotating shaft on the spacing of an encoder pattern 17. That is, the spacing of the encoder pattern 17 may be distorted at a non-flat portion due to thickness variations in the intermediate transfer belt 10 at the time of manufacture or other variations in the intermediate transfer belt 10 caused by environmental changes, and the scale sensor 16 may not be able to accurately detect the surface speed of the intermediate transfer belt 10 by reading the encoder pattern 17.

The encoder pattern 17 may be formed by attaching a sheet encoder pattern onto the intermediate transfer belt 10, directly patterning the intermediate transfer belt 10, integrally forming the encoder pattern 17 in the process of manufacturing the intermediate transfer belt 10, or any other suitable manner.

In the present embodiment, the scale sensor 16 is assumed to be a reflective optical sensor having equally spaced slits, but the present invention is not limited thereto. The scale sensor 16 may be any sensor that can accurately detect the surface position of the intermediate transfer belt 10 based on the encoder pattern 17. For example, in some embodiments, a CCD camera may be used to detect the surface position of the intermediate transfer belt 10 through image processing. Also, in some embodiments, the encoder pattern 17 may not be necessary if a Doppler sensor or some other sensor that is capable of detecting the surface position of the intermediate transfer belt 10 through image processing based on irregularities on the belt surface is used, for example.

Further, in some embodiments, a rotary encoder system may be used to detect the surface speed of the intermediate transfer belt 10. For example, the rotary encoder system may include a rotation detector arranged on the rotating shaft of the driven roller 13. The driven roller 13 is a roller driven by the endless movement of the intermediate transfer belt 10, and the surface speed of the intermediate transfer belt 10 may be detected by the rotation detector arranged thereon.

In the conveying device 100, a portion of the intermediate transfer belt 10 extending from the position of the driven roller 13 to the position of the intermediate transfer roller 11 comes into contact with photosensitive drums 19 for the colors M (magenta), C (cyan), Y (yellow), and K (black) to form primary transfer nips for the colors C, M, Y, and K. Also, transfer rollers are arranged on the inner side of the intermediate transfer belt 10 to come into contact with the intermediate transfer belt 10 at the positions where the primary transfer nips for the colors C, M, Y, and K are formed. In the conveying device 100, a transfer bias is applied to the transfer rollers by a power source, and a transfer electric field is formed between the intermediate transfer belt 10 and the photosensitive drums 19 at the primary transfer nips.

In the conveying device 100, a color image is formed at a primary transfer portion where the primary transfer nips are formed, and as such, the surface speed of the intermediate transfer belt 10 is preferably detected and controlled at the primary transfer portion. In this respect, according to a preferred embodiment, a rotary encoder may be installed on the driven roller 13, or the scale sensor 16 may be installed between the driven roller 13 and the intermediate transfer roller 11.

The tension roller 14 according to the present embodiment is pressed against the intermediate transfer belt 10 from the outer side of the belt loop to generate a constant belt tension. The belt tension generated by the tension roller 14 brings the intermediate transfer belt 10 into contact with the surface of each stretching roller, and the intermediate transfer belt 10 is conveyed in a circumferential direction (belt conveying direction). Note that the contact force between the surface of the driven roller 13 and the intermediate transfer belt 10 has a correlation with the belt conveying frictional force of the driven roller 13, and the pressing force of the tension roller 14 is set up so that the required belt conveying frictional force for conveying the intermediate transfer belt 10 can be secured.

Also, in the conveying device 100, the secondary transfer roller 31 is arranged to come into contact with the surface of the intermediate transfer belt 10 at a position facing the opposing roller 12. By applying an electric charge to the secondary transfer roller 31 and the surface of the intermediate transfer belt 10, recording paper may be attracted to the surface of the intermediate transfer belt 10.

Also, in the conveying device 100, the belt cleaning device 15, which is arranged on the outer side of the belt loop at a position downstream of the secondary transfer roller 31 in the belt conveying direction, is in contact with the intermediate transfer belt 10. The belt cleaning device 15 collects foreign matter, such as toner adhered to the surface of the intermediate transfer belt 10, from the surface of the intermediate transfer belt 10 using the potential difference between the toner and the belt cleaning device 15.

The motor control unit 200 according to the present embodiment feedback-controls the intermediate transfer motor 21 in order to control the surface speed of the intermediate transfer belt 10 to be constant.

Specifically, the motor control unit 200 outputs a drive control signal S3 for the intermediate transfer motor 21 based on an output signal S1 of the scale sensor 16 indicating the surface speed of the intermediate transfer belt 10 and an output signal S2 of the roller encoder 22 indicating the rotational speed of the intermediate transfer roller 11.

Also, the motor control unit 200 feedback-controls the secondary transfer motor 32 and the registration motor 42 in order to reduce variations in the surface speed of the intermediate transfer belt 10 due to influences of a recording medium (e.g., paper) passing through a secondary transfer unit 50 where the secondary transfer roller 31 and the intermediate transfer belt 10 come into contact. Specifically, the motor control unit 200 outputs a drive control signal S4 for the secondary transfer motor 32 based on the output signal S1 of the scale sensor 16 and the output signal S2 of the roller encoder 22.

Further, the motor control unit 200 controls contact and separation between the secondary transfer roller 31 and the opposing roller 12.

In the following, the mechanism around the secondary transfer roller 31 will be described with reference to FIG. 1B. In the conveying device 100, a secondary transfer motor 32 is installed as a separate drive source from the intermediate transfer motor 21. The secondary transfer motor 32 is rotated by the drive control signal S4 from the motor control unit 200.

The secondary transfer motor 32 uses the same type of motor as the intermediate transfer motor 21, such as brushed DC motor or a brushless DC motor. The rotational speed of the secondary transfer motor 32 is decelerated by a speed reduction mechanism (motor gear and reduction gear arranged at the secondary transfer roller 31). The secondary transfer roller 31 is driven by the secondary transfer motor 32 to rotate and convey the recording medium that has been conveyed to the secondary transfer unit 50.

The opposing roller 12, which supports the intermediate transfer belt 10, is arranged on the opposite side of the secondary transfer roller 31. The secondary transfer roller 31 can be controlled to be in contact with the opposing roller 12 via the intermediate transfer belt 10 or be separated from the opposing roller 12.

Note that the secondary transfer roller 31 and the opposing roller 12 may be brought into contact with one another by a spring. Also, the secondary transfer roller 31 includes a cam mechanism that can move in the directions of arrow Y in FIG. 1B to move the secondary transfer roller 31 away from the secondary transfer opposing roller 12. In this way, contact/separation between the two rollers at the secondary transfer unit 50 can be controlled.

In the conveying device 100 according to the present embodiment, the secondary transfer roller 31 has an elastic layer arranged on its surface in order to improve transferability at the secondary transfer unit 50. For example, the secondary transfer roller 31 may be configured by a low inertia thin metal pipe as a core and a conductive rubber roller portion (elastic rubber layer) made of a low hardness rubber material, such as silicone rubber, arranged around the pipe and a urethane coating layer applied on the surface of rubber material.

In the present embodiment, the conductive rubber roller portion of the secondary transfer roller 31 may be configured by arranging vulcanized rubber or silicone rubber having a rubber hardness of 40° or lower (Shore A hardness scale) or less as a lower layer, and arranging a thin urethane coating layer on the surface of the rubber layer to reduce viscosity of the surface. In this way, a nip portion formed between the secondary transfer roller 31 and the intermediate transfer belt 10 may be enlarged through contact deformation of the conductive rubber roller portion and a required amount of pressure for image transfer may be secured, for example.

Note that it is generally difficult to achieve a low hardness of 40° or less using a rubber structure other than a foam rubber structure. For example, in the case of using vulcanized rubber, the viscosity is increased by the addition of a plasticizer. Silicone rubber tends to become highly viscous as well. As a result, mobility of both the intermediate transfer belt 10 and the secondary transfer roller 31 may be compromised due to adhesion at a pressure contact portion 51 where the intermediate transfer belt 10 and the secondary transfer roller 31 come into contact with each other, or adhesion at a portion where these moving members come into contact with a recording medium, for example. Such problems may be effectively avoided by applying an urethane coating on the surface of the rubber layer as described above.

The intermediate transfer motor 21 is controlled by the motor control unit 200 to maintain the surface speed of the intermediate transfer belt 10 to be constant.

In the following, the mechanical configuration around the registration roller 41 will be described with reference to FIG. 1C.

The registration roller 41 of the conveying device 100 according to the present embodiment is rotated by a registration motor 42. When the registration motor 42 is driven and rotated, the rotation of the registration motor 42 is transmitted to the registration roller 41 via gears to cause rotation of the registration roller 41. A recording medium is conveyed to the pressure contact portion 51 between the secondary transfer roller 31 and the opposing roller 12 by a registration unit 60 formed by the registration roller 41 and the opposing roller 43 arranged opposite the registration roller 41. The recording medium that has been conveyed to the pressure contact portion 51 is thus held between the secondary transfer roller 31 and the intermediate transfer belt 10. In other words, the pressure contact portion 51 corresponds to a nip portion at which the recording medium is held between the secondary transfer roller 31 and the intermediate transfer belt 10.

As described above, in the conveying device 100 according to the present embodiment, a recording medium is conveyed from the registration unit 60 to the secondary transfer unit 50. Then, the conveying device 100 presses the secondary transfer roller 31 against the intermediate transfer belt 10 at the secondary transfer unit 50 and transfers a toner image onto the recording medium.

At this time, the surface speeds of the secondary transfer roller 31 and the registration roller 41 may fluctuate due to differences in the type of the recording medium, the tolerance of each roller, contact pressure variations, and deviations in the shape of the rollers caused by environmental factors and aging, for example.

Such fluctuation also causes a fluctuation in the surface speed of the intermediate transfer belt 10. In other words, fluctuations in the surface speeds of the secondary transfer roller 31 and the registration roller 41 cause the generation of interference torque, which causes a fluctuation in the driving torque of the intermediate transfer motor 21 that drives the intermediate transfer belt 10.

Accordingly, in the present embodiment, the rotational speeds of the secondary transfer roller 31 and the registration roller 41 are controlled in order to maintain the surface speed of the intermediate transfer belt 10 at a constant speed. In other words, in the present embodiment, the rotational speeds of the secondary transfer roller 31 and the registration roller 41 are controlled to prevent the generation of interference torque with respect to the driving torque of the intermediate transfer motor 21.

Note that a recording medium used in the present embodiment may be paper, a sheet film, or any other type of sheet material. That is, the recording medium may be any medium that can have an image transferred thereon and conveyed by the conveying device 100.

In the following, the interference torque generated between the secondary transfer motor 32 and the intermediate transfer motor 21 will be described below with reference to FIGS. 2A, 2B, and 3.

Figure 2A:
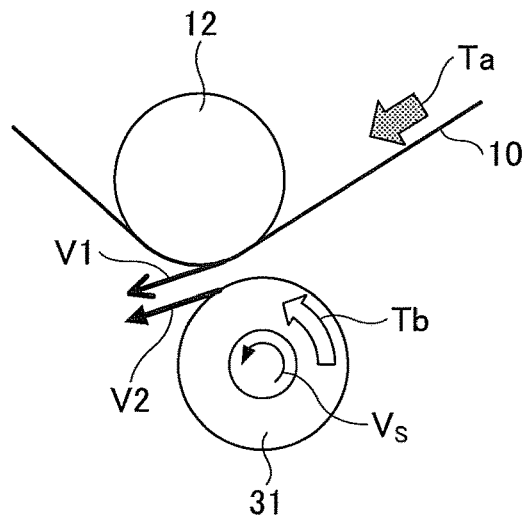
FIGS. 2A and 2B are diagrams illustrating interference torque generated when a secondary transfer roller and an intermediate transfer belt come into contact with each other due to variations in the surface speeds of the secondary transfer roller and the intermediate transfer belt.
Figure 2B:
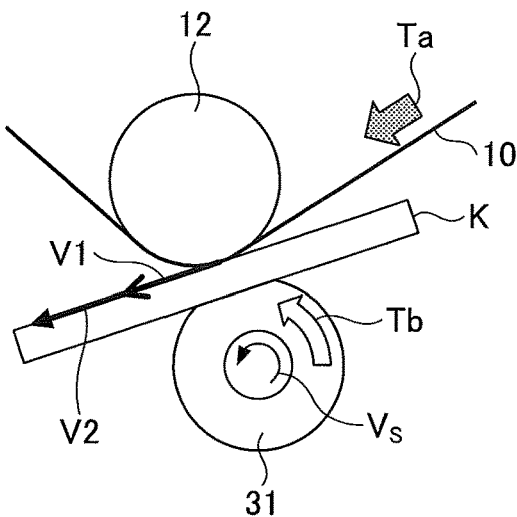

FIGS. 2A and 2B are diagrams illustrating interference torque generated when the secondary transfer roller 31 and the intermediate transfer belt 10 come into contact due to variations in their surface speeds. FIG. 2A illustrates a case where the secondary transfer roller 31 and the intermediate transfer belt 10 are driven at a constant rotational speed in a state where the secondary transfer roller 31 and the intermediate transfer belt 10 are separated from each other. FIG. 2B illustrates a case where the secondary transfer roller 31 and the intermediate transfer belt 10 are driven at a constant rotational speed in a state where the secondary transfer roller 31 is arranged to be in contact with the intermediate transfer belt 10 to pass (convey) a sheet of paper K.

The rotational speed of the intermediate transfer motor 21 is feedback-controlled based on a surface speed V1 of the intermediate transfer belt 10 obtained by the scale sensor 16 such that the surface speed V1 is at a target value. In this way, the surface speed V1 of the intermediate transfer belt 10 is controlled to be constant.

Also, the secondary transfer motor 32 is feedback-controlled based on the rotational speed obtained by the motor encoder 34, and in this way, a rotational speed Vs of the rotating shaft of the secondary transfer roller 31 is controlled to be constant. Further, the rotational speed Vs is controlled to match the surface speed V1 of the intermediate transfer belt 10.

However, influences such as the thickness of the paper K can cause a mismatch between the surface speed V1 of the intermediate transfer belt 10 and a surface speed V2 of the secondary transfer roller 31. For example, in FIG. 2A, when the secondary transfer roller 31 and the intermediate transfer belt 10 are separated from each other and are driven at a constant speed, a driving torque is generated for singly driving each of the intermediate transfer motor 21 and the secondary transfer motor 32.

A driving torque Ta of the intermediate transfer motor 21 may vary due to individual unit differences resulting from friction with the intermediate transfer roller 11, surface speed differences and contact friction with the photosensitive drums 19, contact with the cleaning device 15, environmental factors, and aging, for example. However, the driving torque Ta generated in the example case of FIG. 2A is the single driving torque for driving the intermediate transfer belt 10.

Also, a driving torque Tb of the secondary transfer motor 32 may vary due to friction with the secondary transfer roller 31, for example. However, the driving torque Tb generated in the example case of FIG. 2A is the single driving torque for driving the secondary transfer roller 31.

In other words, no interference torque is generated at the intermediate transfer motor 21 and the secondary transfer motor 32 in the state illustrated in FIG. 2A.

FIG. 2A illustrates an ideal state for conveying the intermediate transfer belt 10. That is, FIG. 2A illustrates a state in which the intermediate transfer belt 10 is conveyed only by the intermediate transfer motor 21. In such case, no other load is applied to the intermediate transfer motor 21, and color shifts and the like may be most effectively avoided.

Accordingly, in the present embodiment, the driving torque Ta of the intermediate transfer motor 21 in the state illustrated in FIG. 2A is set as a reference torque T0. The motor control unit 200 according to the present embodiment controls the rotational speeds of the secondary transfer roller 31 and the registration roller 41 so that the driving torque Ta of the intermediate transfer motor 21 is always equal to the reference torque T0.

When a sheet of paper K is conveyed by the secondary transfer roller 31 as illustrated in FIG. 2B, the surface speed V2 of the secondary transfer roller 31 substantially varies depending on the thickness of the paper K. As such, a difference occurs between the surface speed V1 of the intermediate transfer belt 10 and the surface speed V2 of the secondary transfer roller 31.

Because the intermediate transfer belt 10 and the secondary transfer roller 31 are feedback-controlled to be at a constant speed, interference torque is generated when the surface speeds V1 and V2 differ from one another.

The interference torque generated in the present embodiment may be a torque component to be borne by the secondary transfer motor 32 for rotating the intermediate transfer belt 10. Alternatively, the interference torque generated in the present embodiment may be a torque component to be borne by the intermediate transfer motor 21 for rotating the secondary transfer roller 31.

In FIG. 2B, the surface speed V2 of the secondary transfer roller 31 becomes faster than the surface speed V1 of the intermediate transfer belt 10 owing to the thickness of the paper K. Also, the surface speed V1 of the intermediate transfer belt 10 is controlled to be at a constant speed.

Thus, the driving torque Tb of the secondary transfer motor 32 increases due to the interference torque, and the driving torque Ta of the intermediate transfer motor 21 decreases due to the interference torque.

Figure 3:
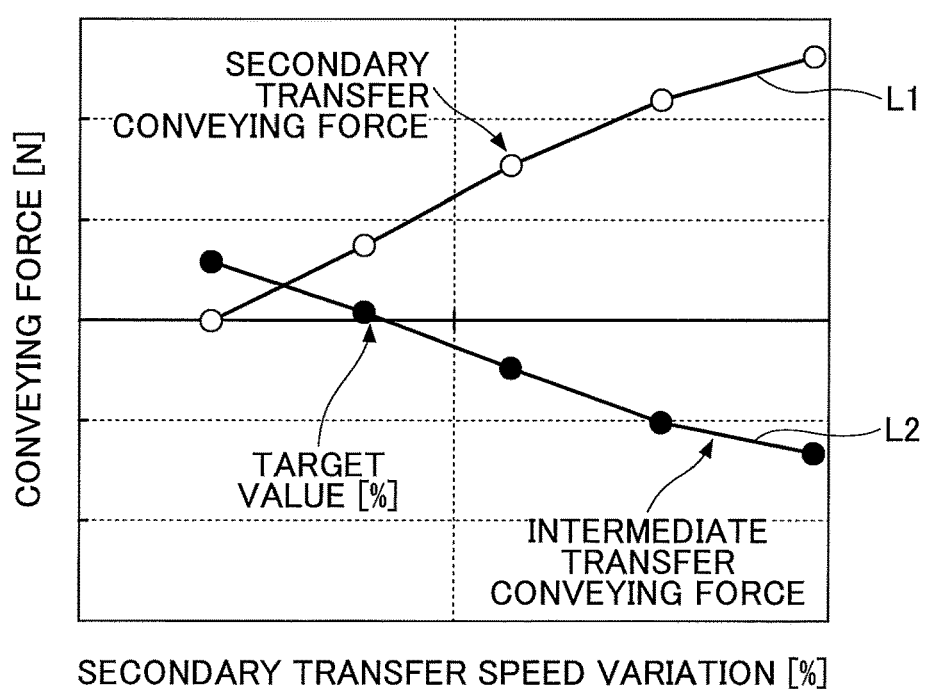
FIG. 3 is a graph illustrating the interference torque generated between the secondary transfer roller and the intermediate transfer belt.

FIG. 3 is a graph illustrating the interference torque caused by contact between the secondary transfer roller and the intermediate transfer belt and variations in their surface speeds.

In the graph of FIG. 3, the horizontal axis represents variations in the speed of the second transfer roller 31, and the vertical axis represents a conveying force.

In FIG. 3, the variations in the speed of the secondary transfer roller 31 is represented as a percent change [%] with respect to a set speed of the secondary transfer roller 31. The set speed of the secondary transfer roller 31 is a target value assumed to enable the surface speed of the secondary transfer roller 31 to match the surface speed of the intermediate transfer belt 10. Note that the surface speed of the secondary transfer roller 31 does not necessarily coincide with the set speed due to various factors, such as paper type, roller tolerance, contact pressure fluctuations, environmental changes, and temporal changes, for example.

The conveying force of the intermediate transfer motor 21 is obtained by converting the driving torque Ta [Nm] of the intermediate transfer motor 21 estimated in view of design values, such as roller diameters of the secondary transfer roller 31 and the intermediate transfer motor 21, into a conveying force [N] of the intermediate transfer motor 21. Note that the driving torque Ta of the intermediate transfer motor 21 is the driving torque of the intermediate transfer belt 10 and the conveying force of the intermediate transfer motor 21 is the conveying force of the intermediate transfer belt 10.

The conveying force of the secondary transfer motor 32 is obtained by converting the driving torque Tb [Nm] of the secondary transfer motor 32 estimated in view of the reduction gear ratio and the diameter of the secondary transfer roller 31, for example, into a conveying force [N] of the secondary transfer motor 32.

In the present embodiment, the driving torque of the intermediate transfer belt 10 and the driving torque of the secondary transfer motor 32 are converted into conveying forces in order to represent them on the same axis.

In the present embodiment, an estimated value of the driving torque Ta of the intermediate transfer motor 21 is calculated based on a PWM command value supplied to the intermediate transfer motor 21 and the actual rotational speed of the intermediate transfer motor 21. Note that in a state where a motor is accurately controlled to a constant speed or a predetermined speed, the torque value may be calculated based solely on the current value or the PWM command value.

In the following, the interference torque illustrated in FIG. 3 will be described. Line L1 in FIG. 3 represents the relationship between the rotational speed of the secondary transfer roller 31 and the conveying force of the secondary transfer roller 31. Line L2 in FIG. 3 represents the relationship between the rotational speed of the secondary transfer roller 31 and the conveying force of the intermediate transfer motor 21.

In the present embodiment, the conveying force of the intermediate transfer motor 21 and the conveying force of the secondary transfer motor 32 in a state where no interference torque is generated (state illustrated in FIG. 2A) are each set to "0" (reference).

In the following description, it is assumed that paper is being passed through the intermediate transfer belt 10 and the secondary transfer roller 31 while the intermediate transfer belt 10 and the secondary transfer roller 31 are feedback-controlled to a constant rotational speed. In such case, the surface speed V2 of the secondary transfer roller 31 does not coincide with the surface speed V1 of the intermediate transfer belt 10 due to factors such as the paper thickness. For example, when the paper passed through the secondary transfer roller 31 is thick and the surface speed V2 of the secondary transfer roller 31 increases, the driving torque Tb of the secondary transfer motor 32 increases and the driving torque Ta of the intermediate transfer motor 21 decreases.

In other words, when the rotational speed of the secondary transfer roller 31 increases, the conveying force L1 of the secondary transfer motor 32 increases, and the conveying force L2 of the intermediate transfer motor 21 decreases. Also, when the rotational speed of the secondary transfer roller 31 decreases, the conveying force L1 of the secondary transfer motor 32 decreases, and the conveying force L2 of the intermediate transfer motor 21 increases.

As can be appreciated, the conveying force L1 of the secondary transfer roller 31 and the conveying force L2 of the intermediate transfer motor 21 are inversely correlated.

In the present embodiment, the rotational speed of the secondary transfer roller 31 is controlled so that the driving torque Ta of the intermediate transfer motor 21 is always equal to the reference torque T0 of the intermediate transfer motor 21 when singly driving the intermediate transfer belt 10. In the example of FIG. 3, the rotational speed Vs of the secondary transfer roller 31 when the conveying force L2 of the intermediate transfer motor 21 is equal to 0 is set up as the target value (optimal value) for the rotational speed of the secondary transfer roller 31. In other words, in the present embodiment, the rotational speed of the secondary transfer motor 32 when the conveying force L2 of the intermediate transfer motor 21 is equal to 0 is set up as the target value (optimal value) for the rotational speed of the secondary transfer motor 32.

In the present embodiment, the driving torque Ta of the intermediate transfer motor 21 is controlled to be the same in both the case where the intermediate transfer motor 21 singly drives the intermediate transfer belt 10 and the case where paper is passed through the secondary transfer roller 31. In this way, the surface speed V1 of the intermediate transfer belt 10 can be controlled to be constant and drive operations of the intermediate transfer belt 10 can be stabilized. Also, by stabilizing the drive operations of the intermediate transfer belt 10, positional variations of the intermediate transfer belt 10, the occurrence of surface speed differences in the intermediate transfer belt 10 and the secondary transfer roller 31 may be reduced, and color shifts in the secondary transfer operation may be prevented to thereby improve image quality.

In the following, the interference torque generated between the secondary transfer motor 32 and the registration motor 42 will be described with reference to FIGS. 4A, 4B, and 5.

Figure 4B:
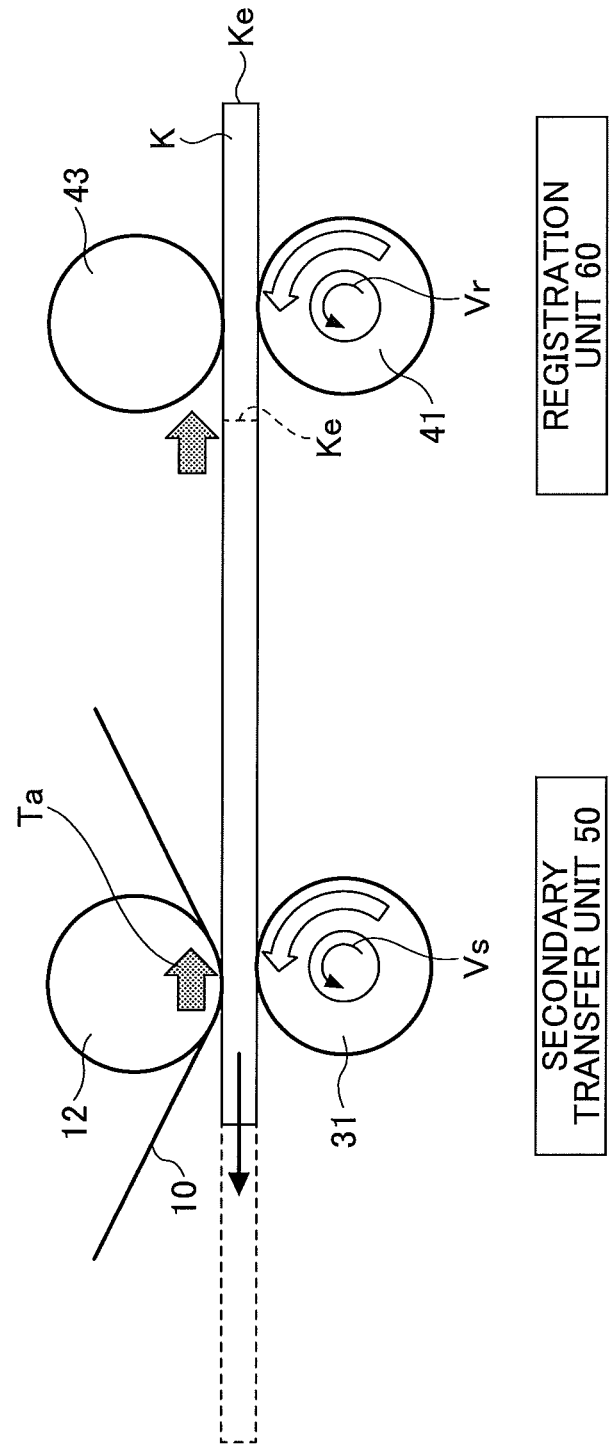

FIGS. 4A and 4B are diagrams illustrating the interference torque generated between the secondary transfer motor 21 and the registration motor 42. FIG. 4A illustrates an example case where the surface speed of the registration roller 41 is higher than the surface speeds of the intermediate transfer roller 11 and the secondary transfer roller 31. FIG. 4B illustrates an example case where the surface speed of the registration roller 41 is lower than the surface speeds of the intermediate transfer roller 11 and the secondary transfer roller 31.

The registration motor 42 of the present embodiment is feedback-controlled based on the rotational speed obtained by the motor encoder 45, and as such, a rotational speed Vr of a rotating shaft of the registration roller 41 is always constant.

In the conveying device 100, when the surface speed of the registration roller 41 (rotational speed of the registration motor 42) differs from the surface speed V1 of the intermediate transfer belt 10, interference torque is generated between the registration motor 42 and the intermediate transfer motor 21.

The interference torque described above is generated by the intermediate transfer motor 21 receiving influences of the registration roller 41 pushing/pulling the paper K with respect to the secondary transfer roller 31. Such interference torque may be measured based on a variation in the driving torque Ta of the intermediate transfer motor 21 between a case where the paper K passes through both the secondary transfer roller 31 and the registration roller 41 and a case where the paper K passes through only the secondary transfer roller 31 and does not pass through the registration roller 41.

In the present embodiment, the generation of interference torque with respect to the intermediate transfer motor 21 due to the pushing/pulling of the paper K by the registration roller 41 is prevented by controlling the amount of variation in the driving torque Ta to be close to 0.

FIG. 4A illustrates a state where the paper K passes through both the registration roller 41 and the secondary transfer roller 31. In other words, FIG. 4A illustrates a state where the paper K is passing through both the secondary transfer unit 50 and the registration unit 60.

In FIG. 4A, the surface speed of the registration roller 41 is higher than the surface speed V1 of the intermediate transfer belt 10 and the surface speed V2 of the secondary transfer roller 31, and as such, the registration roller 41 is pushing the paper K toward the secondary transfer roller 31.

In this case, the surface speed V2 of the secondary transfer roller 31 (rotational speed of the secondary transfer motor 32) increases, and interference torque occurs between the surface of the paper K and the surface of the intermediate transfer belt 10. In the present embodiment, the motor control unit 200 lowers the driving torque Ta of the intermediate transfer motor 21 in order to control the surface speed V1 of the intermediate transfer belt 10 to a constant speed.

Also, when the paper K continues to be conveyed in FIG. 4A such that the end Ke of the paper K moves past the registration unit 60 and the paper K only passes through the secondary transfer unit 50, the force pushing the paper K toward the secondary transfer roller 31 disappears. In turn, the surface speed V2 of the secondary transfer roller 31 decreases.

Because the motor control unit 200 controls the surface speed V1 of the intermediate transfer belt 10 to be a constant speed, the driving torque Ta of the intermediate transfer motor 21 is controlled to increase.

In the present embodiment, a first conveying section refers to a section of a conveying path in which the paper K passes through and is conveyed by both the secondary transfer unit 50 and the registration unit 60, and a second conveying section refers to a section of the conveying path in which the paper K passed through only the secondary transfer unit 50.

That is, when the registration roller 41 is pushing the paper K toward the secondary transfer roller 31 as illustrated in FIG. 4A, the driving torque Ta of the intermediate transfer motor 21 decreases in the first conveying section and increases in the second conveying section. In other words, when the surface speed of the registration roller 41 is higher than the surface speeds of the intermediate transfer roller 11 and the secondary transfer roller 31, the driving torque Ta of the intermediate transfer motor 21 decreases in the first conveying section and increases in the second conveying section.

In FIG. 4B, the surface speed of the registration roller 41 is lower than the surface speeds V1 and V2 of the intermediate transfer roller 11 and the secondary transfer roller 31, and as such, the registration roller 41 is pulling the paper K from the secondary transfer roller 31.

In such case, the surface speed V2 of the secondary transfer roller 31 decreases, and an interference torque is generated between the surface of the paper K and the surface of the intermediate transfer belt 10. Also, in this case, because the motor control unit 200 controls the surface speed V1 of the intermediate transfer belt 10 to be a constant speed, the driving torque Ta of the intermediate transfer motor 21 is controlled to increase.

When the paper K continues to be conveyed in FIG. 4B such that the end Ke of the paper K moves past the registration unit 60 and the paper K only passes through the secondary transfer unit 50, the force of the registration roller 41 pulling the paper K from the secondary transfer roller 31 disappears. In turn, the surface speed V2 of the secondary transfer roller 31 increases.

Because the motor control unit 200 controls the surface speed V1 of the intermediate transfer belt 10 to be a constant speed, the driving torque Ta of the intermediate transfer motor 21 is controlled to decrease.

That is, in a state where the registration roller 41 is pulling the paper K from the secondary transfer roller 31, the driving torque Ta of the intermediate transfer motor 21 increases in the first conveying section and decreases in the second conveying section. In other words, when the surface speed of the registration roller 41 is lower than the surface speeds of the intermediate transfer roller 11 and the secondary transfer roller 31, the driving torque Ta of the intermediate transfer motor 21 increases in the first conveying section and decreases in the second conveying section.

Figure 5:
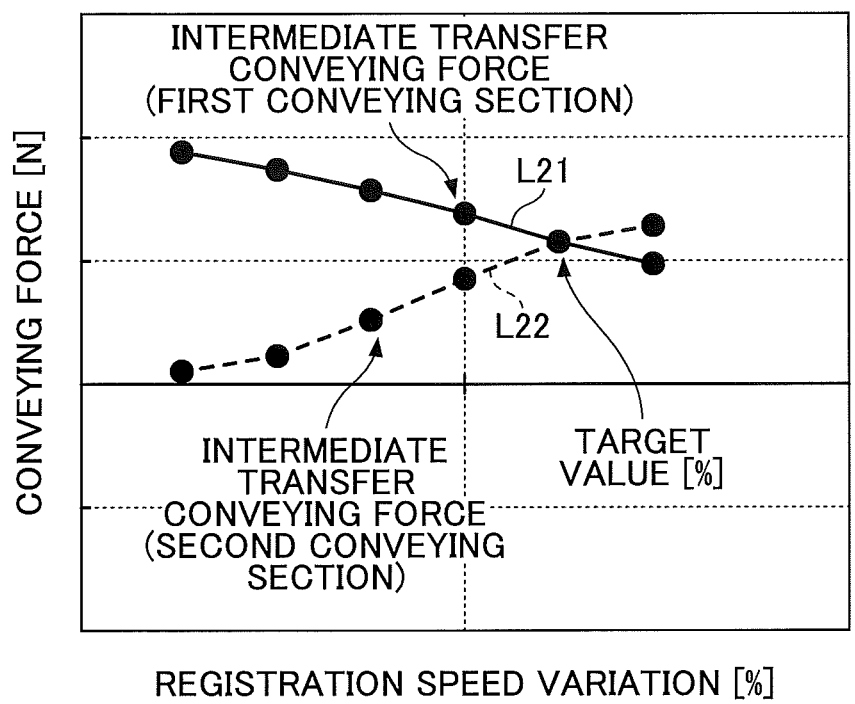
FIG. 5 is a graph illustrating the interference torque generated between the secondary transfer motor and the registration motor.

FIG. 5 is a graph illustrating the interference torque generated between the secondary transfer motor 31 and the registration motor 42.

In FIG. 5, the horizontal axis represents a variation in the speed of the registration roller 41 as a percent change [%] with respect to a set speed of the registration roller 41. The set speed of the registration roller 41 is a target value assumed to enable the surface speed of the registration roller 41 to match the surface speed of the intermediate transfer belt 10. Note that the vertical axis of FIG. 5 represents a conveying force converted from a driving torque as described above with reference to FIG. 3.

Line L21 in FIG. 5 represents the relationship between the rotational speed of the registration roller 41 and the conveying force of the intermediate transfer motor 21 in the first conveying section, and line L22 represents the relationship between the rotational speed of the registration roller 41 and the conveying force of the intermediate transfer motor 21 in the second conveying section.

As described with reference to FIGS. 4A and 4B, when the rotational speed of the registration roller 41 is higher than the surface speeds of the intermediate transfer roller 11 and the secondary transfer roller 31, the driving torque Ta of the intermediate transfer motor 21 decreases in the first conveying section and increases in the second conveying section. When the rotational speed of the registration roller 41 is lower than the surface speeds of the intermediate transfer roller 11 and the secondary transfer roller 31, the driving torque Ta of the intermediate transfer motor 21 increases in the first conveying section and decreases in the second conveying section.

Thus, as illustrated in FIG. 5, the conveying force L21 of the intermediate transfer motor 21 in the first conveying section decreases as the rotational speed of the registration roller 41 increases, and the conveying force L22 of the intermediate transfer motor 21 in the second conveying section increases as the rotational speed of the registration roller 41 increases.

In the present embodiment, it can be assumed that the intermediate transfer motor 21 is least susceptible to influences of the registration roller 41 pushing/pulling the paper K with respect to the secondary transfer roller 31 when the difference between the conveying force L21 in the first conveying section and the conveying force L22 in the second conveying section is equal to zero (i.e., L21=L22).

Accordingly, in the present embodiment, the rotational speed of the registration roller 41 when the difference between the conveying force L21 in the first conveying section and the conveying force L22 in the second conveying section is equal to 0 is set up as the target value (optimal value) for the rotational speed of the registration roller 41. In other words, in the present embodiment, the rotational speed of the registration motor 42 when the difference between the conveying force L21 in the first conveying section and the conveying force L22 in the second conveying section is equal to 0 is set up as the target value (optimum value) for the rotational speed of the registration motor 42.

Note that in an image forming apparatus, a conveying device, and a rotating member control device according to embodiments of the present embodiment as described below, a target value for the rotational speed of the secondary transfer motor 32 and a target value for the rotational speed of the registration motor 42 are set up in view of the interference torque as described above. The target values that are set up correspond to values for removing the interference torque caused by influences of the secondary transfer motor 32 and the registration motor 42 on the driving torque Ta of the intermediate transfer motor 21 for driving the intermediate transfer belt 10.

Figure 6:
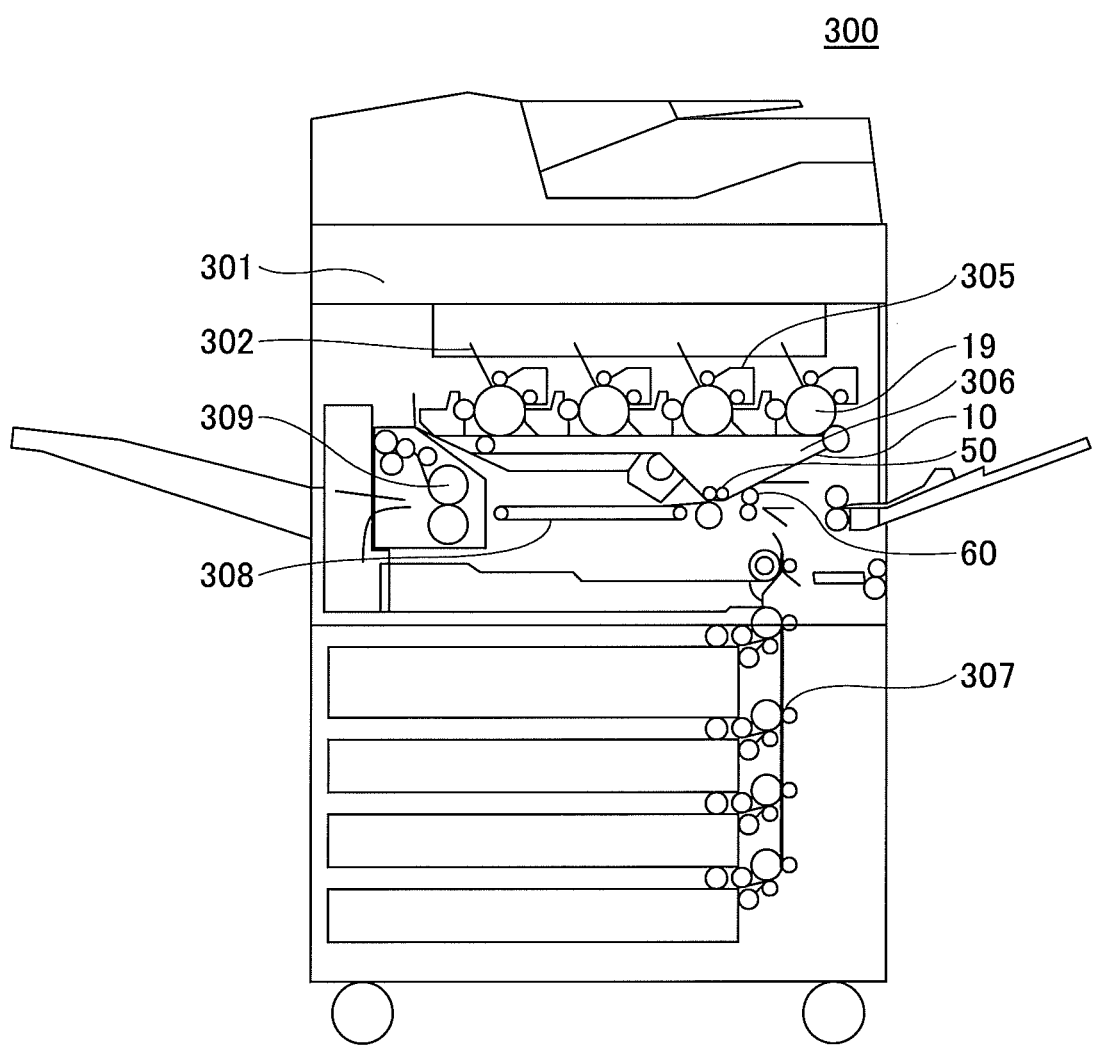
FIG. 6 is a diagram illustrating an overall configuration of an image forming apparatus according to the first embodiment.

FIG. 6 is a diagram illustrating an overall configuration of an image forming apparatus 300 according to the first embodiment.

The image forming apparatus 300 of the present embodiment may be a digital multifunction peripheral that uses the electrophotographic system to form an image and may include a copying function, a printer function, and a facsimile function, for example. Note, however, that the image forming apparatus 300 may also use the ink jet printing system to form an image by ejecting ink droplets, a sublimation type thermal transfer system, or a dot impact system, for example. The image forming apparatus 300 according to the present embodiment includes the conveying device 100.

The image forming apparatus 300 according to the present embodiment includes an image scanning unit 301, an image writing unit 302, the photosensitive drum 19, a developing unit 305, an intermediate transfer unit 306 including the intermediate transfer belt 10, the secondary transfer unit 50, the registration unit 60, a tray 307, a conveying unit 308, and a fixing unit 309.

The image scanning unit 301 of the image forming apparatus 300 scans a document by irradiating light on the document with a light source and obtaining a scanned image from the light reflected by the document using a 3-line CCD (Charge Coupled Device) sensor, for example. The scanned image is subjected to image processing, such as scanner gamma correction, color conversion, image separation, gradation correction processing, and the like, by an image processing unit after which the processed image is transmitted to the image writing unit 302.

The image writing unit 302 modulates driving of a LD (Laser Diode) according to image data. The photosensitive drum 19 that is uniformly charged and rotated is exposed to a laser beam that is emitted from the LD so that an electrostatic latent image is formed on the photosensitive drum 19. The developing unit 305 applies toner to the electrostatic latent image to develop a toner image as a visible image.

The toner image formed on the photosensitive drum 19 is transferred onto the intermediate transfer belt 10 of the intermediate transfer unit 306. When full-color copying is executed in the image forming apparatus 300, toner images of four colors (black, cyan, magenta, and yellow) are sequentially superimposed on the intermediate transfer belt 10. When image formation and transfer of the images in all the colors are completed, the registration unit 60 supplies a recording medium from the tray 307 in synch with the operation of the intermediate transfer belt 10, and the toner image transferred onto the intermediate transfer belt 10 is secondarily transferred onto the recording medium at the secondary transfer unit 50. The recording medium onto which the toner image has been transferred is conveyed to the fixing unit 309 via the conveying unit 308 and discharged after the toner image has been fixed on the recording medium by a fixing roller and a pressure roller.

Figure 7:
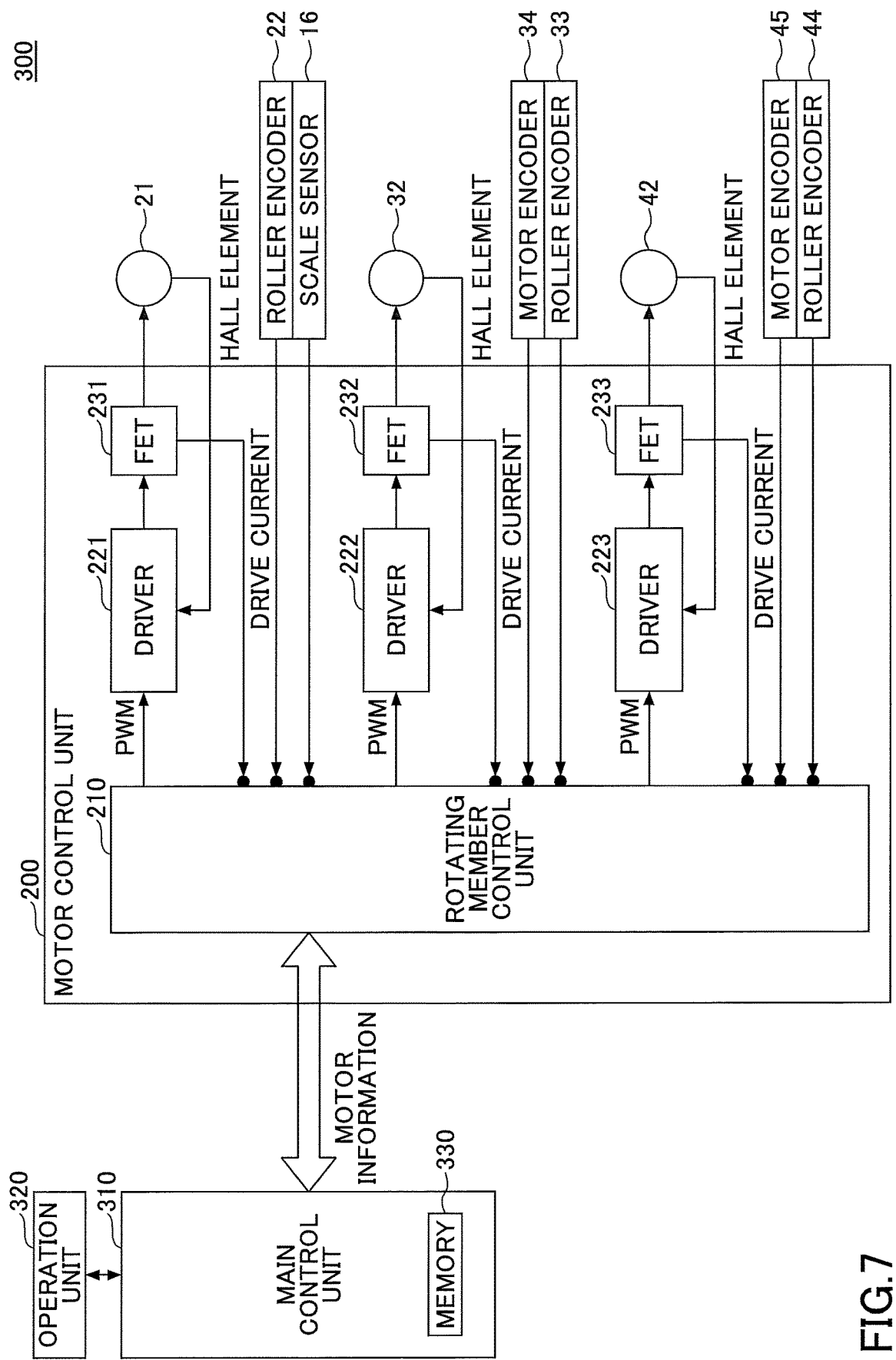
FIG. 7 is a diagram illustrating a motor control unit according to the first embodiment.

FIG. 7 is a diagram illustrating a motor control unit 200 according to the first embodiment.

The motor control unit 200 according to the present embodiment is included in the conveying device 100 and controls driving of the plurality of rotating members illustrated in FIG. 1 (the intermediate transfer roller 11, the secondary transfer roller 31, and the registration roller 41). In the present embodiment, the motor control unit 200 determines the target values for the rotational speeds of the secondary transfer roller 31 and the registration roller 41 to avoid torque interference with respect to the intermediate transfer motor 21.

In the image forming apparatus 300 according to the present embodiment, the motor control unit 200 is connected to a main control unit 310 that controls overall operations of the image forming apparatus 300. The motor control unit 200 controls the rotational speed of the intermediate transfer motor 21 and the rotational speeds of the secondary transfer motor 32 and the registration motor 42.

When an instruction to output image data is input to the main control unit 310 via an operation unit 320 of the image forming apparatus 300, the main control unit 310 instructs the motor control unit 200 to drive the motors of the conveying device 100. Specifically, upon receiving an image data output instruction, for example, the main control unit 310 transmits an instruction to the motor control unit 200 including command values for the motors, start/stop commands, target values for the rotational speed, and the rotating direction, for example. Upon receiving this instruction, the motor control unit 200 controls driving of the motors. The main control unit 310 also exchanges information relating to the motors (motor information) with the motor control unit 200. Further, the main control unit 310 includes a memory 330 for storing information relating to the motors (motor information). The information relating to the motors may include, for example, the rotational speed (set speed) of each motor, a PWM value according to the command value, a drive current, and an encoder value.

The motor control unit 200 according to the present embodiment includes a rotating member control unit 210, drivers 221, 222, and 223, and FETs (field-effect transistors) 231, 232, and 233.

As will be described in detail below, the rotating member control unit 210 adjusts the target value for the rotational speed of the secondary transfer motor 32 and the target value for the rotational speed of the registration motor 42, and stores the adjusted target values in the memory 330. Note that the rotational speed of the secondary transfer motor 32 may be regarded as synonymous with the rotational speed of the secondary transfer roller 31, and the rotational speed of the registration motor 42 may be regarded as synonymous with the rotational speed of the registration roller 41.

The driver 221 and the FET 231 have a function of supplying a constant driving current to the intermediate transfer motor 21. The driver 222 and the FET 232 have a function of supplying a constant driving current to the secondary transfer motor 32. The driver 223 and the FET 233 have a function of supplying a constant driving current to the registration motor 42.

The rotating member control unit 210 acquires the surface speed of the intermediate transfer belt 10 and the rotational speed of the intermediate transfer motor 21 from the roller encoder 22 and the scale sensor 16 of the intermediate transfer roller 11. Further, the rotating member control unit 210 acquires the rotational speeds of the secondary transfer motor 32 and the secondary transfer roller 31 from the motor encoder 34 and the roller encoder 33. Further, the rotating member control unit 210 acquires the rotational speeds of the registration motor 42 and the registration roller 41 from the motor encoder 45 and the roller encoder 44.

Further, the rotating member control unit 210 acquires the driving currents of the intermediate transfer motor 21, the secondary transfer motor 32, and the registration motor 42, calculates a control output for each of the motors, and outputs a PWM command value corresponding to the control output to each of the drivers 221 to 223.

More specifically, the rotating member control unit 210 calculates the driving current of each of the motors based on a PWM command value. However, errors may occur due to influences of fluctuations and responsiveness of a motor drive circuit including a driver. Thus, to determine the driving current of the motor with higher accuracy, the rotating member control unit 210 may measure the current of the FET and determine the driving current of the motor based thereon. Specifically, the rotating member control unit 210 may determine the driving current based on the current value of a current flowing through a shunt resistor connected to the FETs 231 to 233.

Note that the PWM command value output at this time is a value for getting the surface speed of the intermediate transfer belt 10 acquired by the rotating member control unit 210 and the rotational speeds of the secondary transfer roller 31 and the registration roller 41 close to their target values.

When PWM command values are input to the drivers 221, 222, and 223, each of the drivers can recognize the rotational angle of its corresponding motor (the intermediate transfer motor 21, the secondary transfer motor 32, or the registration motor 42) based on a Hall element signal from the corresponding motor. Each of the drivers converts a PWM signal generated based on the PWM command value into a three-phase motor output signal and drives the corresponding motor via the corresponding FET 231, 232, or 233.

By implementing the above operations, the rotating member control unit 210 of the present embodiment can control the rotational speeds of the intermediate transfer motor 21, the secondary transfer motor 32, and the registration motor 42 to be close to their target values based on the command values for the respective motors.

Further, the rotating member control unit 210 calculates driving torques based on the obtained driving currents. Specifically, the rotating member control unit 210 acquires the rotational speed and the driving current of each of the motors 21, 32, and 42 (or the rollers 11, 31, and 41), and converts the driving current into a torque using a torque conversion table indicating the relationship between the torque factor and speed, for example.

Further, the rotating member control unit 210 may store data acquired or calculated by the rotating member control unit 210 in the memory 330, transmit information such as an abnormality notification to the main control unit 310. Note that the rotating member control unit 210 may also include a memory, for example.

As described above, in the present embodiment, the rotating member control unit 210 functions as a part of a rotating member control device that controls driving of the three rotating members (the intermediate transfer roller 11, the secondary transfer roller 31, and the registration roller 41).

Figure 8:
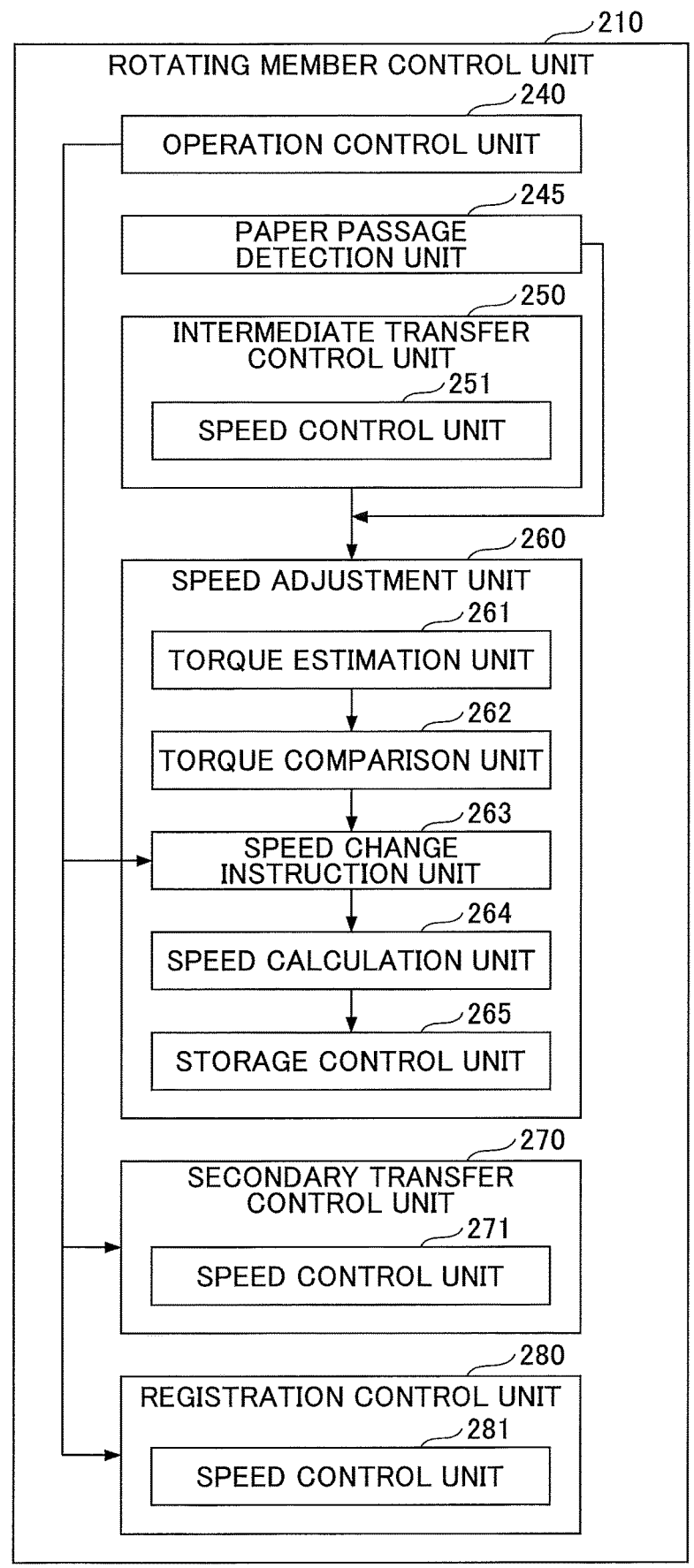
FIG. 8 is a diagram illustrating functions of a rotating member control unit according to the first embodiment.

In the following, functions of the rotating member control unit 210 will be described with reference to FIG. 8. FIG. 8 is a diagram illustrating an example functional configuration of the rotating member control unit 210 according to the first embodiment.

The rotating member control unit 210 of the present embodiment may be an arithmetic processing unit including a memory, for example. Each of the functional units of the rotating member control unit 210 described below is implemented by the arithmetic processing unit executing a rotating member control program stored in the memory.

The rotating member control unit 210 according to the present embodiment includes an operation control unit 240, a paper passage detection unit 245, an intermediate transfer control unit 250, a speed adjustment unit 260, a secondary transfer control unit 270, and a registration control unit 280.

The operation control unit 240 controls separation/contact between the secondary transfer roller 31 and the opposing roller 12.

The paper passage detection unit 245 detects when a recording medium reaches the secondary transfer unit 50 and the registration unit 60 and passes through the secondary transfer unit 50 and the registration unit 60.

The intermediate transfer control unit 250 includes a speed control unit 251 that controls the surface speed of the intermediate transfer belt 10 to a target value. Specifically, the speed control unit 251 acquires the rotational speed of the intermediate transfer motor 21, and performs feedback control so that the rotational speed equals the target value for the surface speed of the intermediate transfer belt 10 that is included in the motor information.

The speed adjustment unit 260 adjusts the target value for the rotational speed of the secondary transfer motor 32 and the target value for the rotational speed of the registration motor 42 such that interference by the secondary transfer roller 31 and the registration roller 41 with respect to the intermediate transfer belt 10 can be prevented. Note that the speed adjustment unit 260 will be described in detail below.

The secondary transfer control unit 270 includes a speed control unit 271 that controls the rotational speed of the secondary transfer motor 32 as a target value by the speed control unit 271. Specifically, the speed control unit 271 acquires the rotational speed of the secondary transfer motor 32 and performs feedback control so that the rotational speed equals the target value for the rotational speed of the secondary transfer motor 32 included in the motor information. Further, the speed control unit 271 receives a speed change instruction from the speed adjustment unit 260 and controls the rotational speed of the secondary transfer motor 32 based on the received speed change instruction.

The registration control unit 280 includes a speed control unit 281 that controls the rotational speed of the registration motor 42 to equal its corresponding target value. Specifically, the speed control unit 281 acquires the rotational speed of the registration motor 42 and performs feedback control so that the rotational speed equals the target value for the rotational speed of the registration motor 42 included in the motor information. Further, the speed control unit 281 receives a speed change instruction from the speed adjustment unit 260 and controls the rotational speed of the registration motor 42 based on the received speed change instruction.

The speed adjustment unit 260 according to the present embodiment includes a torque estimation unit 261, a torque comparison unit 262, a speed change instruction unit 263, a speed calculation unit 264, and a storage control unit 265. The torque estimation unit 261 according to the present embodiment calculates an estimated value of the driving torque Ta of the intermediate transfer motor 21. In other words, the torque estimation unit 261 according to the present embodiment implements a process of acquiring the driving torque Ta of the intermediate transfer motor 21.

More specifically, the estimated value of the driving torque Ta of the intermediate transfer motor 21 is a load torque value calculated based on the PWM command value output from the intermediate transfer control unit 250 to the driver 221 and the rotational speed of the intermediate transfer motor 21 obtained by the scale sensor 16. Note that when the intermediate transfer motor 21 is accurately controlled to a constant speed or a predetermined speed, the estimated value of the driving torque Ta can be calculated based on the current value and the PWM command value supplied to the intermediate transfer motor 21, for example.

In the present embodiment, calculating the estimated value of the driving torque Ta may be regarded as synonymous with calculating the driving torque Ta.

The torque comparison unit 262 calculates an average value T1 of the driving torque Ta of the intermediate transfer motor 21 in the first conveying section and an average value T2 of the driving torque Ta of the intermediate transfer motor 21 in the second conveying section and compares the calculated average values T1 and T2.

The speed change instruction unit 263 issues speed change instructions to the secondary transfer control unit 270 and the registration control unit 280 for changing the rotational speeds of the secondary transfer motor 32 and the registration motor 42 based on the result of the comparison made by the torque comparison unit 262.

The speed calculation unit 264 calculates the target value for the rotational speed of the secondary transfer motor 32 and the target value for the rotational speed of the registration motor 42 based on the comparison result of the torque comparison unit 262. In other words, the speed calculation unit 264 implements a process of setting the rotational speed of the secondary transfer motor 32 and the rotational speed of the registration motor 42.

The storage control unit 265 stores the rotational speeds (target values) calculated by the speed calculation unit 264 in the memory 330.

Figure 9:
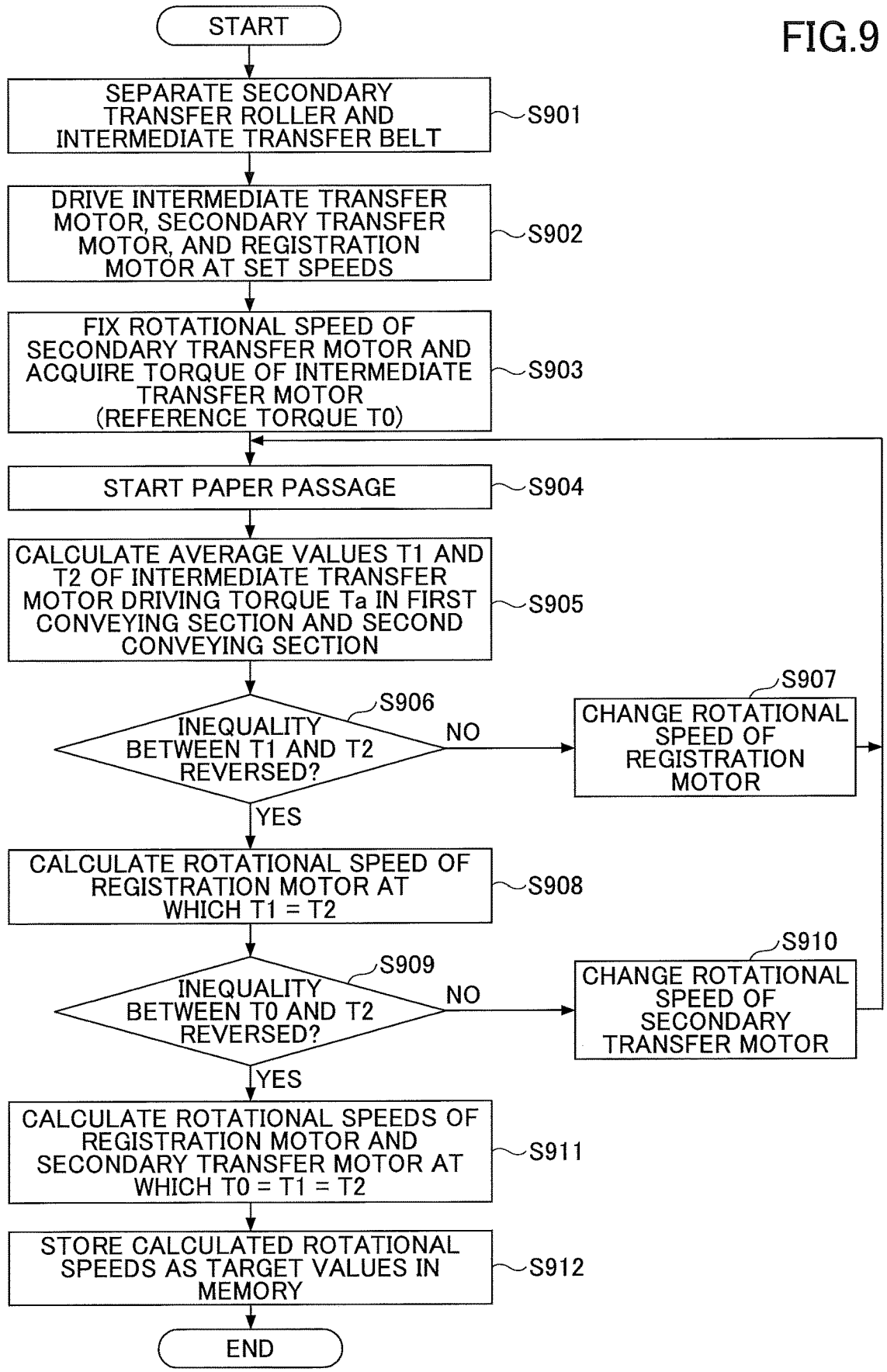
FIG. 9 is a flowchart illustrating operations of the rotating member control unit according to the first embodiment.

In the following, operations of the rotating member control unit 210 according to the present embodiment will be described. FIG. 9 is a flowchart illustrating example operations of the rotating member control unit 210 according to the first embodiment.

Note that the process operations illustrated in FIG. 9 may be executed at a predetermined time, such as at the time the image forming apparatus 300 is shipped from the factory or when the image forming apparatus 300 is installed and ready to be used, for example. Also, the process operations of FIG. 9 may be executed when the type of recording medium conveyed by the conveying device 100 is changed, for example. Further, the process operations of FIG. 9 may be executed at an arbitrary time or may be executed at predetermined intervals in response to an instruction from a user of the image forming apparatus 300, for example. In other words, the process operations of FIG. 9 may be executed at any time as necessary or desired.

Upon receiving a process execution instruction, the rotating member control unit 210 according to the present embodiment controls the operation control unit 240 to separate the secondary transfer roller 31 and the secondary transfer opposing roller 12 (step S901). Then, the rotating member control unit 210 controls the intermediate transfer control unit 250, the secondary transfer control unit 270, and the registration control unit 280 to rotate the intermediate transfer motor 21, the secondary transfer motor 32, and the registration motor 42 (step S902).

Then, the rotating member control unit 210 fixes the rotational speed of the secondary transfer motor 32 and controls the torque estimation unit 261 of the speed adjustment unit 260 to calculate the estimated value of the driving torque Ta of the intermediate transfer motor 21 (hereinafter simply referred to as "driving torque Ta") (step S903). In this process step, the rotational speed of the secondary transfer motor 32 may be fixed to the set speed (target value) included in the motor information. Also, in this process step, the intermediate transfer belt 10 is rotating while the secondary transfer roller 31 and the opposing roller 12 are separated from each other. Thus, the driving torque Ta acquired in step S903 is the driving torque of the intermediate transfer motor 21 when no interference torque with respect to the intermediate transfer motor 21 is generated. In other words, the driving torque Ta acquired in step S903 corresponds to the reference torque T0.

Then, the rotating member control unit 210 starts a paper passage operation (step S904). That is, at this time, the operation control unit 240 brings the secondary transfer roller 31 and the secondary transfer opposing roller 12 into contact with each other. The paper passage operation that is started in step S904 is continued until the process of FIG. 9 is completed. In other words, the rotating member control unit 210 continues the paper passage operation until the process of FIG. 9 is completed.

Then, the rotating member control unit 210 controls the torque comparison unit 262 of the speed adjustment unit 260 to calculate the average value T1 of the driving torque Ta in the first conveying section and the average value T2 of the driving torque Ta in the second conveying section (step S905).

In the following, calculation of the average value T1 and the average value T2 will be described. The rotating member control unit 210 controls the torque estimation unit 261 to start calculation of the driving torque Ta when operations for conveying the paper K is started and the paper passage detection unit 245 detects that the paper K has reached the secondary transfer roller 31 after passing through the registration roller 41.

The torque estimation unit 261 obtains variations in the driving torque Ta at predetermined intervals and stores the variations. The variations in the driving torque Ta may be obtained by calculating the driving torque Ta at predetermined intervals, for example.

Then, when the paper passage detection unit 245 detects that a recording medium (paper K) has passed through the registration roller 41, the rotating member control unit 210 controls the torque comparison unit 262 to calculate the average value T1 of the driving torque Ta in the first conveying section based on the stored variations in the driving torque Ta.

Then, when the paper passage detection unit 245 detects that the paper K has passed through the secondary transfer roller 31, the rotating member control unit 210 controls the torque comparison unit 262 to calculate the average value T2 of the driving torque Ta in the second conveying section based on the variations in the driving torque Ta obtained from the time passage of the paper K through the registration roller 41 was detected to the time passage of the paper K through the secondary transfer roller 31 was detected.

In the following, detection of the passage of the paper K (recording medium) by the paper passage detection unit 245 will be described. For example, the paper passage detection unit 245 according to the present embodiment may use any one of the following three methods to detect passage of a recording medium.
(1) Monitoring the torque detected by each of the encoders 33 and 34 installed in the secondary; transfer roller 31 or the secondary transfer motor 32
(2) Detecting that the resist roller 41 has started conveying a recording medium; or
(3) Monitoring the drive current flowing through the FETs 231, 232, and 233.

In the following, the above method (1) will be specifically described. The torque acting on the secondary transfer roller 31 is larger while a recording medium is conveyed as compared with the case where the recording medium is not conveyed. After receiving a drive instruction from the main control unit 310, the paper passage detection unit 245 waits until the rotational speed of the secondary transfer roller 31 stabilizes and monitors the torque. Then, for example, when the change rate (gradient) of the torque becomes greater than or equal to a threshold value, the paper passage detection unit 245 determines that the recording medium has entered the secondary transfer roller 31.

In the following, the above method (2) will be specifically described. The registration roller 41 has a function of restarting conveying operations by making timing adjustments so that the toner image on the intermediate transfer belt 10 can be printed on the recording medium. Because the main control unit 310 can detect when the registration roller 41 starts conveying the recording medium, the paper passage detection unit 245 receives a notification that the registration roller 41 has started conveying the recording medium from the main control unit 310.

Because the distance from the registration roller 41 to the secondary transfer roller 31 and the conveying speed are known, the paper passage detection unit 245 can determine that the recording medium has entered the secondary transfer roller 31 when a predetermined time has elapsed after receiving the notification from the main control unit 310. Note that as an alternative method, the paper passage detection unit 245 can determine the passage of the recording medium based on a detection of the passage of the recording medium by a sensor installed near the secondary transfer roller 31, for example.

In the following, the above method (3) will be described. The driving currents flowing through the FETs 231, 232, and 233 increase as the load of the secondary transfer roller 31 increases. Thus, when the recording medium enters the secondary transfer roller 31, the driving currents flowing through the FETs 231, 232, and 233 increase. Accordingly, for example, when the change rate (gradient) of the drive currents become greater than or equal to a predetermined value, the paper passage detection unit 245 may determine that the recording medium has entered the secondary transfer roller 31.

After calculating the average values T1 and T2 in step S905, the rotating member control unit 210 controls the torque comparison unit 262 of the speed adjustment unit 260 to compare the average value T1 with the average value T2 to determine whether the inequality between the average value T1 and the average value T2 has been reversed (step S906).

If it is determined in step S906 that the inequality has not been reversed, the speed change instruction unit 263 of the speed adjustment unit 260 instructs the registration control unit 280 to change the rotational speed of the registration motor 42, and in response, the speed control unit 281 of the registration control unit 280 changes the rotational speed of the registration motor 42 (step S907). Then, the process returns to step S904. Note that the rotational speed before the speed change has been implemented is retained in the speed change instruction unit 263.

In the following, control implemented by the registration control unit 280 in step S907 is described. Upon receiving a speed change instruction, the registration control unit 280 controls the speed control unit 281 to change the rotational speed of the registration motor 42.

When the average value T2 is greater than the average value T1 (T2>T1), the speed control unit 281 decreases the rotational speed of the registration motor 42, and when the average value T2 is less than the average value T1 (T2<T1), the speed control unit 281 increases the rotational speed of the registration motor 42.

When the average value T2 is greater than the average value T1 (T2>T1), a force pushing the recording medium toward the secondary transfer roller 31 is exerted by the registration roller 41. As such, the speed change instruction unit 263 instructs the registration control unit 280 to decrease the rotational speed of the registration motor 42.

When the average value T2 is less than the average value T1 (T2<T1), a force pulling the recording medium away from the secondary transfer roller 31 is exerted by the registration roller 41. As such, the speed change instruction unit 263 instructs the registration control unit 280 to increase the rotational speed of the registration motor 42.

If it is determined in step S906 that the inequality between T1 and T2 has been reversed, the speed adjustment unit 260 controls the speed calculation unit 264 to calculate a rotational speed of the registration motor 42 at which the average value T1 would be equal to the average value T2 (T1=T2) based on the rotational speed of the registration motor 42 immediately before the inequality has been reversed and the rotational speed of the registration motor 42 when the magnitude relation has been reversed (step S908).

When the average value T1 is equal to the average value T2 (T1=T2), this means that the driving torque Ta of the intermediate transfer motor 21 in the first conveying section matches the driving torque Ta of the intermediate transfer motor 21 in the second conveying section. In other words, when the average value T1 is equal to the average value T2 (T1=T2), this means that the conveying force L21 of the intermediate transfer motor 21 in the first conveying section matches the conveying force L22 of the intermediate transfer motor 21 in the second conveying section (see FIG. 5).

That is, the intermediate transfer motor 21 is least susceptible to interference torque of the registration motor 42 when the average value T1 is equal to the average value T2 (T1=T2).

Accordingly, in the present embodiment, the speed adjustment unit 260 calculates the rotational speed of the registration motor 42 at which the conveying force L21 would be equal to the conveying force L22.

Then, the torque comparison unit 262 of the speed adjustment unit 260 compares the reference torque T0 acquired in step S903 with the average value T2 of the driving torque Ta in the second conveying section calculated in step S905 to determine whether the inequality between the reference value T0 and the average value T2 has been reversed (step S909).

If it is determined in step S909 that the inequality has not been reversed, the speed change instruction unit 263 of the speed adjustment unit 260 instructs the secondary transfer control unit 270 to change the rotational speed of the secondary transfer motor 32, and in response, the speed control unit 271 of the secondary transfer control unit 270 changes the rotational speed of the secondary transfer motor 32 (step S910). Then, the process returns to step S904. Note that the rotational speed of the secondary transfer motor 32 before the speed change has been implemented is retained by the speed change instruction unit 263.

In the following, control implemented by the secondary transfer control unit 270 in step S910 will be described. Upon receiving a speed change instruction, the secondary transfer control unit 270 controls the speed control unit 271 to change the rotational speed of the secondary transfer motor 32.

The speed control unit 271 increases the rotational speed of the secondary transfer motor 32 when the average value T2 is greater than the reference torque T0 (T2>T0) and decreases the rotational speed of the secondary transfer motor 32 when the average value T2 is less than the reference torque T0 (T2<T0).

When the average value T2 is greater than the reference torque T0 (T2>T0), the surface speed of the secondary transfer roller 31 is lower than the surface speed of the intermediate transfer belt 10, and a force pulling the recording medium is exerted by the secondary transfer roller 31. As such, the speed change instruction unit 263 instructs the secondary transfer control section 270 to increase the rotational speed of the secondary transfer motor 32.

When the average value T2 is less than the reference torque T0, the surface speed of the secondary transfer roller 31 is higher than the surface speed of the intermediate transfer belt 10, and a force pushing the recording medium is exerted by the secondary transfer roller 31. As such, the speed change instruction unit 263 instructs the secondary transfer control unit 270 to decrease the rotational speed of the secondary transfer motor 32.

When it is determined in step S909 that the inequality between the average value T2 and the reference torque T0 has been reversed, the speed adjustment unit 260 controls the speed calculation unit 264 to calculate the rotational speeds of the secondary transfer motor 32 and the registration motor 42 immediately before the inequality has been reversed. Then, the speed calculation unit 264 calculates the rotational speeds of the secondary transfer motor 32 and the registration motor 42 at which the average value T1, the average value T2, and the reference torque T0 would be equal (T1=T2=T0) (step S911).

When the average value T2 is equal to the reference torque T0, this means that the driving torque Ta of the intermediate transfer motor 21 in the second conveying section is equal to the reference torque T0. In other words, when the average value T2 is equal to the reference torque T0 (T2=T0), the conveying force L2 of the intermediate transfer motor 21 in the second conveying section is equal to the conveying force when the intermediate transfer motor 21 singly and independently drives the intermediate transfer belt 10 (see FIG. 3).

That is, the intermediate transfer motor 21 is least susceptible to interference torque of the secondary transfer motor 32 when the average value T2 is equal to the reference torque T0 (T2=T0).

Accordingly, in the present embodiment, the speed adjustment unit 260 calculates the rotational speed of the secondary transfer motor 32 at which the average value T2 would be equal to the reference torque T0.

In the following, the calculation process implemented by the speed calculation unit 264 in step S911 will be described. The speed calculation unit 264 according to the present embodiment calculates interpolated values interpolated using a linear interpolation equation represented by the following linear equation (1) and sets the interpolated values as the rotational speeds of the secondary transfer motor 32 and the registration motor 42 at which the average value T2 would be equal to the reference torque T0. Note that linear equation (1) represents the ratio of the rotational speed of the secondary transfer motor 32 to the rotational speed of the registration motor 42, assuming "x" represents the rotational speed of the secondary transfer motor 32 and "y" represents the rotational speed of the registration motor 42.

$$Y=ax+b \quad (1)$$

The speed calculation unit 264 according to the present embodiment sets the rotational speed of the secondary transfer motor 32 immediately before the inequality has been reversed in step S909 to "x1", sets the rotational speed of the registration motor 42 immediately before the inequality has been reversed to "y1", and substitutes these values into linear equation (1). Also, the speed calculation unit 264 sets the rotational speed of the secondary transfer motor 32 at the time the inequality has been reversed in step S909 to "x2", sets the rotational speed of the registration motor 42 at the time the inequality has been reversed to "y2", and substitutes these values into linear equation (1). In this way, the following equations (2) and (3) are obtained.

$$y1=ax1+b \quad (2)$$

$$y2=ax2+b \quad (3)$$

Based on the above equations (2) and (3), the following equations (4) and (5) are obtained.

$$a=(y1-y2)/(x1-x2) \quad (4)$$

$$b=(y2 \cdot x2 - y1 \cdot x1)/(x1-x2) \quad (5)$$

Based on the above equations (4) and (5), the linear equation (1) is obtained. Thus, the speed calculation unit 262 can obtain a midpoint (x12, y12) of (x1, y1) and (x2, y2) in the linear equation (1) to obtain the value of "x12" as the rotational speed of the secondary transfer motor 32 and the value of "y12" as the rotational speed of the registration motor 42 at which the average value T1, the average value T2, and the reference torque T0 would be equal (T1=T2=T0).

As described above, in the present embodiment, the target values for the rotational speeds of the secondary transfer motor 32 and the registration motor 42 are calculated based on ratios of the rotational speed of the registration motor 42 to the rotational speed of the secondary transfer motor 32 immediately before the average value T1, the average value T2, and the reference torque T0 become equal, and when the average value T1, the average value T2, and the reference torque T0 become equal.

After step S911, the speed adjustment unit 260 controls the storage control unit 265 to store the two calculated rotational speeds as the target value for the rotational speed of the secondary transfer motor 32 and the target value for the rotational speed of the registration motor 42 in the memory 330 (step S912), and the process is ended thereafter.

According to an aspect of the present embodiment, the target values for the rotational speeds of the secondary transfer motor 32 and the registration motor 42 are adjusted in the manner described above, and in this way, a state in which the intermediate transfer motor 21 is substantially free from influences of torque interference by the secondary transfer motor 32 and the registration motor 42 may be recreated. Thus, according to an aspect of the present embodiment, torque interference with respect to the intermediate transfer motor 21 can be substantially eliminated, and the surface speed of the intermediate transfer belt 10 can be stabilized.

Also, according to an aspect of the present embodiment, optimal target values for the rotational speeds of the secondary transfer motor 32 and the registration motor 42 according to the type of paper (recording medium) used may be easily derived in order to eliminate the interference torque, i.e., without having to determine in advance the relationship between the surface speed of the intermediate transfer belt 10 and the set speed of the secondary transfer motor 32 which may greatly vary depending on factors, such as paper thickness, surface properties, and rigidity of the paper, for example.

Note that in the present embodiment, the conveying device 100 is installed in the image forming apparatus 300 that forms an electrostatic latent image on the photosensitive drum 19, develops the latent image into a toner image, and transfers the toner image onto a recording medium. However, the present invention is not limited to such an embodiment. For example, the conveying device 100 may be installed in an inkjet image forming apparatus. Also, the conveying device 100 does not necessarily have to be installed in an image forming apparatus and may be installed in any apparatus with a device that conveys a sheet-type recording medium by rotating a plurality of rotating members and includes a separating mechanism at a pressure contact portion between the rotating members.

Second Embodiment

In the following, a second embodiment of the present invention will be described. The second embodiment differs from the first embodiment in that the registration roller 41 is not provided and only the secondary transfer roller 31 is provided as a roller for conveying a recording medium. In the following description of the second embodiment, elements having the same functions as those of the first embodiment are given the same reference numerals and their descriptions may be omitted. Thus, only elements and features of the second embodiment that differ from those of the first embodiment will be described.

Figure 10A:
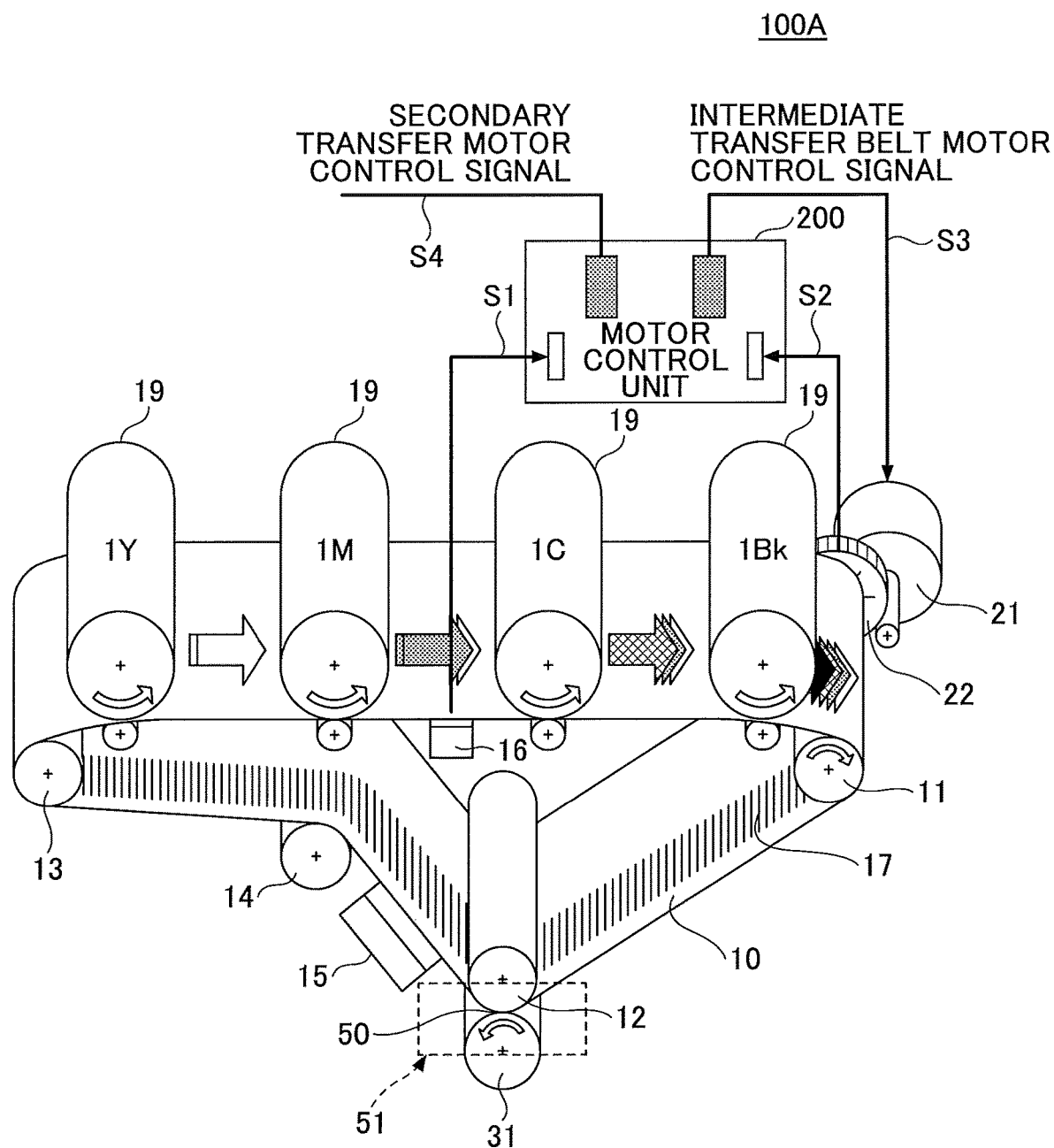
FIGS. 10A and 10B are diagrams illustrating a conveying device according to a second embodiment of the present invention.
Figure 10B:
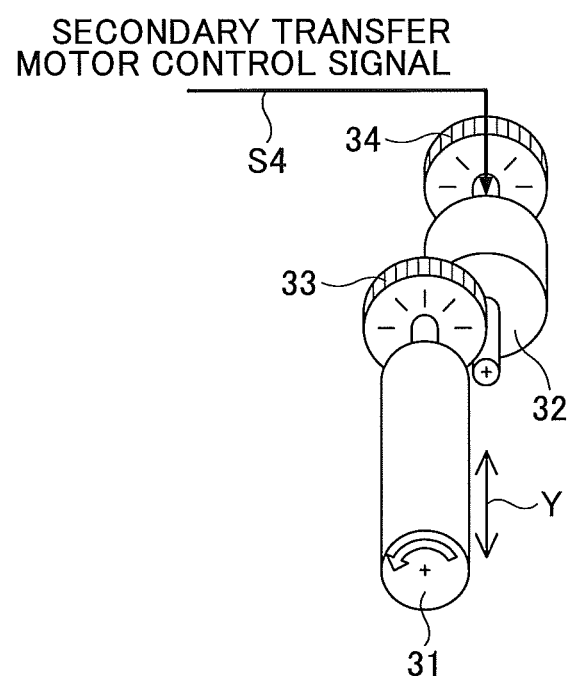

FIGS. 10A and 10B are diagrams illustrating an example configuration of a conveying device 100A according to the second embodiment. FIG. 10A illustrates an overall configuration of the conveying device 100A, and FIG. 10B illustrates the configuration around the secondary transfer unit 50.

The conveying device 100A according to the present embodiment differs from the conveying device 100 according to the first embodiment in that it does not include the registration roller 41, the registration motor 42, and the opposing roller 43.

In some examples, the conveying device 100A according to the present embodiment may include a secondary transfer belt stretched over the secondary transfer roller 31 and a stretching roller. In this case, when the secondary transfer roller 31 is rotationally driven, the secondary transfer belt may be endlessly moved. The conveying device 100A according to the present embodiment includes a motor control unit 200A.

Figure 11:
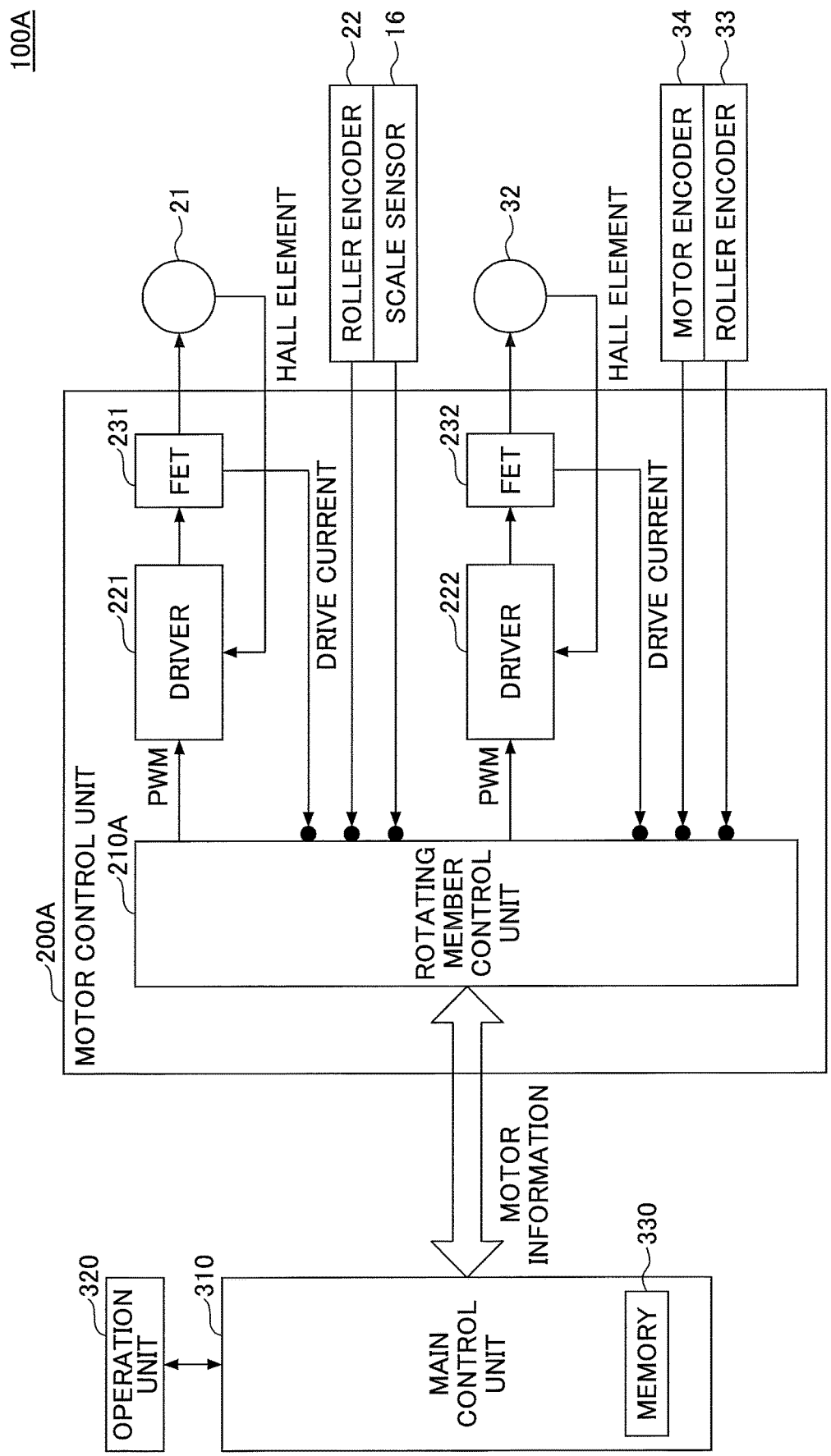
FIG. 11 is a diagram illustrating a motor control unit according to the second embodiment.

FIG. 11 is a diagram illustrating the motor control unit 200A according to the second embodiment.

The motor control unit 200A according to the present embodiment differs from the first embodiment in that it controls the intermediate transfer motor 21 and the secondary transfer motor 32, but does not have a mechanism for controlling the registration motor 42.

The motor control unit 200A according to the present embodiment includes a rotating member control unit 210A, the drivers 221 and 222, and the FETs 231 and 232, but does not include the driver 223 and the FET 233.

Figure 12:
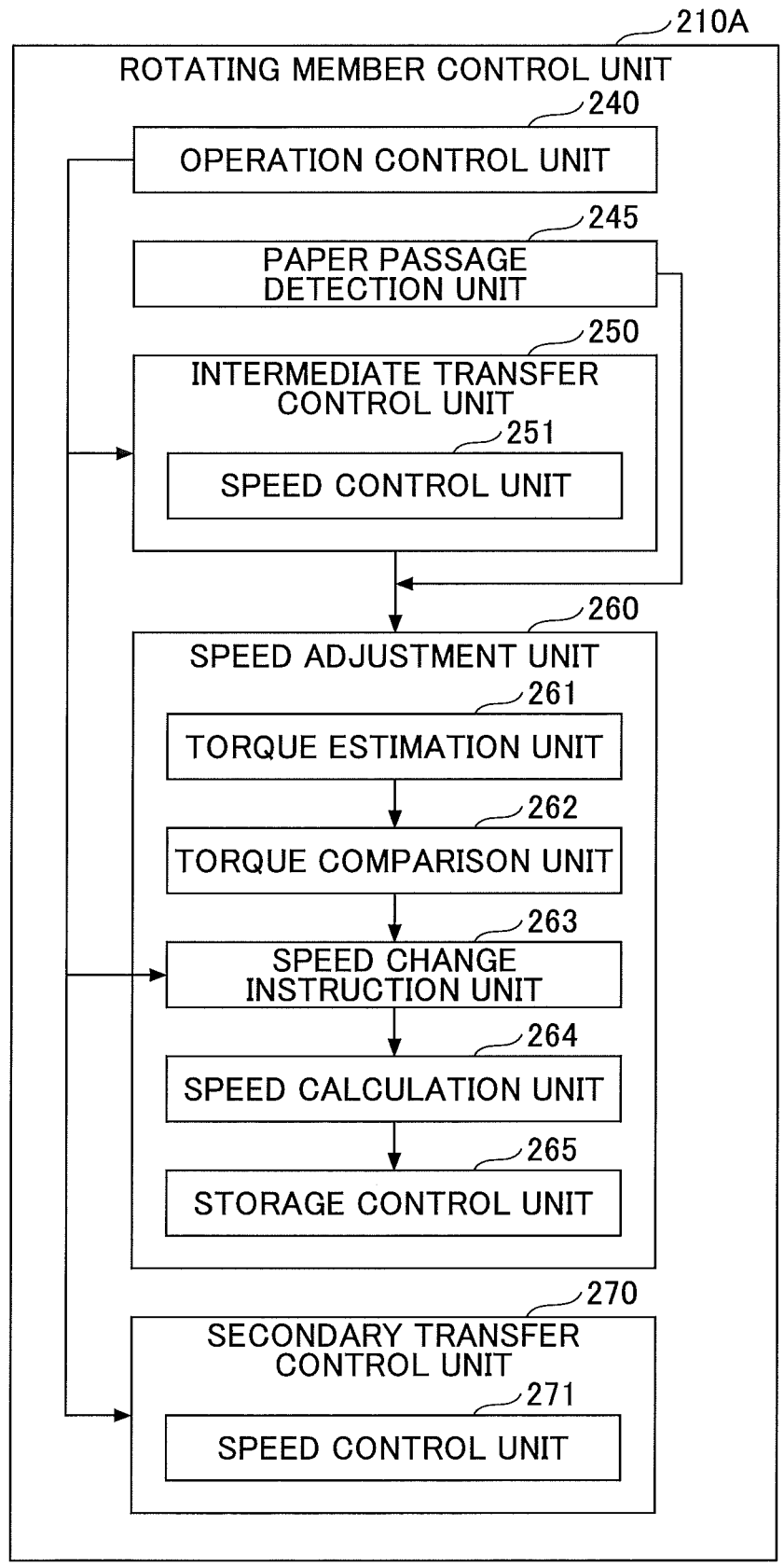
FIG. 12 is a diagram illustrating functions of a rotating member control unit according to the second embodiment.

FIG. 12 is a diagram illustrating an example functional configuration of the rotating member control unit 210A according to the second embodiment. The rotating member control unit 210A includes the operation control unit 240, the paper passage detection unit 245, the intermediate transfer control unit 250, the speed adjustment unit 260, and the secondary transfer control unit 270. That is, the functional configuration of the rotating member control unit 210A according to the second embodiment is substantially similar to that of the rotating member control unit 210 according to the first embodiment, but does not include the registration control unit 280.

The rotating member control unit 210A adjusts the rotational speed of the secondary transfer motor 32 such that the driving torque Ta of the intermediate transfer motor 21 equals the reference torque T0 while paper K is passed through the secondary transfer unit 50.

Figure 13:
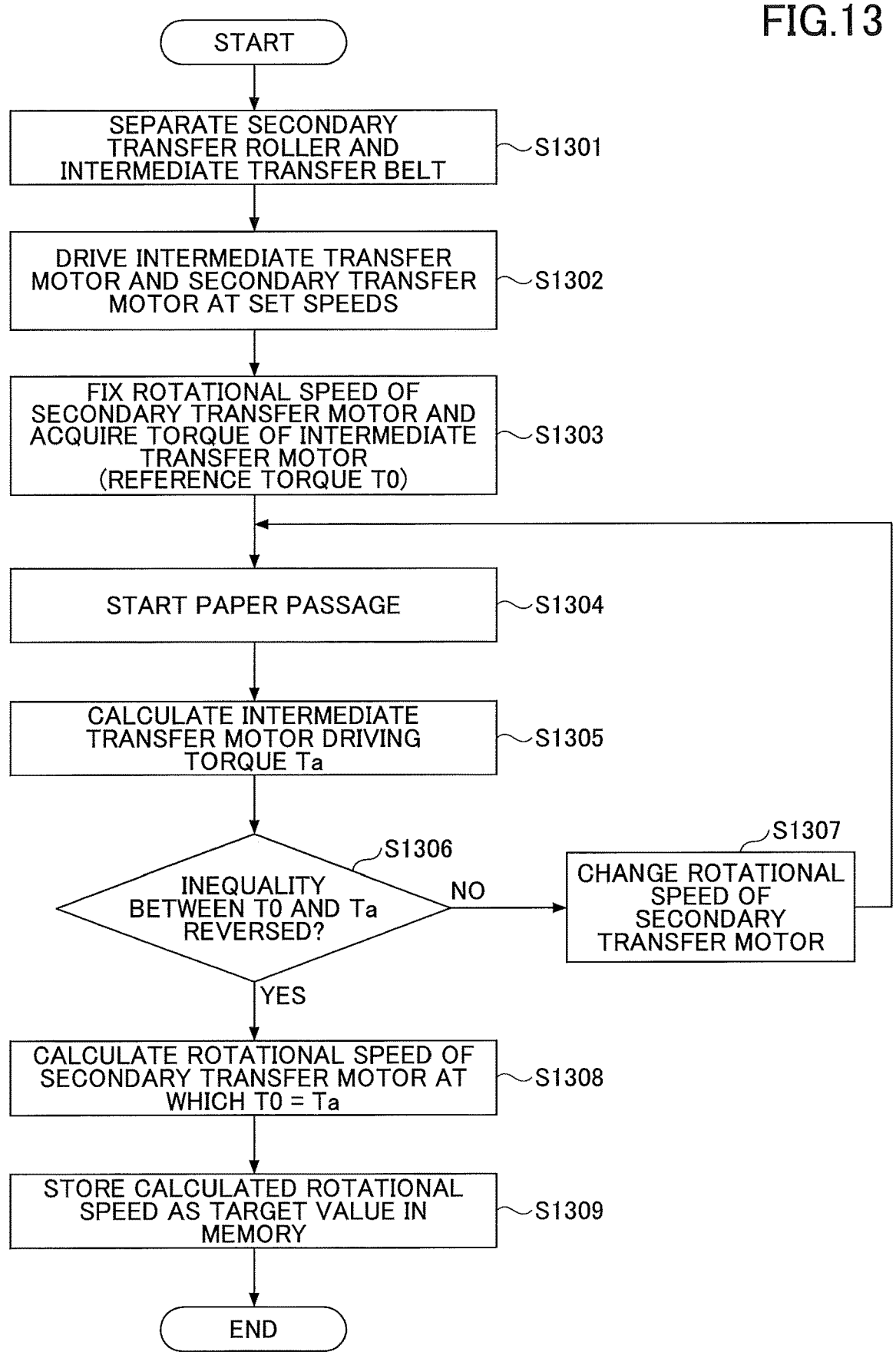
FIG. 13 is a flowchart illustrating operations of the rotating member control unit according to the second embodiment.

FIG. 13 is a flowchart illustrating process operations of the rotating member control unit 210A according to the second embodiment.

Upon receiving a process execution instruction, the rotating member control unit 210A according to the present embodiment controls the operation control unit 240 to separate the secondary transfer roller 31 and the opposing roller 12 (step S1301). Then, the rotating member control unit 210A controls the intermediate transfer control unit 250 and the secondary transfer control unit 270 to drive (rotate) the intermediate transfer motor 21 and the secondary transfer motor 32 at their respective set speeds included in the motor information (step S1302).

Then, the rotating member control unit 210A fixes the rotational speed of the secondary transfer motor 32, and controls the torque estimation unit 261 of the speed adjustment unit 260 to calculate an estimated value of the driving torque Ta of the intermediate transfer motor 21 (hereinafter simply referred to as "driving torque Ta") (step S1303). The driving torque Ta acquired in step S1303 is the driving torque of the intermediate transfer motor 21 when no interference torque with respect to the intermediate transfer motor 21 is generated. That is, the driving torque Ta acquired in step S1303 corresponds to the reference torque T0. Then, the rotating member control unit 210A starts a paper passage operation (step S1304). At this time, the operation control unit 240 brings the secondary transfer roller 31 and the secondary transfer counter roller 12 into contact with each other.

Then, the rotating member control unit 210A controls the torque estimation unit 261 of the speed adjustment unit 260 to calculate the driving torque Ta of the intermediate transfer motor 21 (step S1305). Then, the rotating member control unit 210A controls the torque comparison unit 262 to compare the calculated driving torque Ta and the reference torque T0 to determine whether the inequality between the driving torque Ta and the reference torque T0 has been reversed (step S1306).

If it is determined in step S1306 that the inequality has not been reversed, the speed change instruction unit 263 of the speed adjustment unit 260 instructs the secondary transfer control unit 270 to change the rotational speed of the secondary transfer motor 32, and in response, the speed control unit 271 of the secondary transfer control unit 270 changes the rotational speed of the secondary transfer motor (step S1307). Then, the process returns to step S1305. Note that the speed change instruction unit 263 retains the rotational speed of the secondary transfer motor 32 before the speed change has been implemented.

In the following, the process of step S1307 will be described. When the driving torque Ta is greater than the reference torque T0 (Ta>T0), the rotational speed Vs of the secondary transfer roller 31 is lower than the surface speed V1 of the intermediate transfer belt 10. In other words, the secondary transfer roller 31 is pulling the paper K with respect to the intermediate transfer belt 10.

Thus, the speed change instruction unit 263 instructs the secondary transfer control unit 270 to increase the rotational speed Vs of the secondary transfer roller 31.

When the driving torque Ta is less than the reference torque T0 (Ta<T0), the rotational speed Vs of the secondary transfer roller 31 is higher than the surface speed V1 of the intermediate transfer belt 10. In other words, the secondary transfer roller 31 is pushing the paper K with respect to the intermediate transfer belt 10.

Thus, the speed change instruction unit 263 instructs the secondary transfer control unit 270 to decrease the rotational speed Vs of the secondary transfer roller 31.

When the inequality between the driving torque Ta and the reference torque T0 is reversed in step S1306, the speed calculation unit 264 of the speed adjustment unit 260 acquires the rotational speed of the secondary transfer motor 32 immediately before the inequality has been reversed. The speed calculation unit 264 calculates the rotational speed of the secondary transfer motor 32 at which the driving torque Ta would be equal to the reference torque T0 (Ta=T0) based on the acquired rotational speed of the secondary transfer motor 32 immediately before the inequality has been reversed and the rotational speed of the secondary transfer motor 32 when the inequality has been reversed (step S1308).

Note that the processes of step S1309 following step S1308 is substantially similar to the process of step S912 of FIG. 9, a description thereof will be omitted.

As described above, according to an aspect of the present embodiment, the rotational speed of the secondary transfer motor 32 is controlled such that the driving torque Ta of the intermediate transfer motor 21 is equal to the reference torque T0 even during paper passage. In this way, a state in which the intermediate transfer motor 21 is singly and independently driving the intermediate transfer belt 10 without torque interference may be recreated even during paper passage, and the occurrence of torque interference with respect to the intermediate transfer motor 21 may be prevented.

That is, according to an aspect of the present embodiment, the surface speed V1 of the intermediate transfer belt 10 may be maintained at the speed when the intermediate transfer motor 21 is singly and independently driving the intermediate transfer belt 10, and driving of the intermediate transfer belt 10 can be stabilized.

Third Embodiment

In the following, a third embodiment of the present invention will be described. The third embodiment differs from the first embodiment in that another value is substituted for the estimated value of the driving torque Ta. In the following description of the third embodiment, elements and features that differ from those of the first embodiment will be explained, and descriptions of features and elements having substantially the same functions as those of the first embodiment will be omitted.

In controlling the intermediate transfer motor 21, the secondary transfer motor 32, and the registration motor 42 to be at a constant rotational speed in an image forming apparatus, a value other than the estimated value of the driving torque Ta of the intermediate transfer motor 21 can be used to control the motors.

This is because fluctuations in interference torque due to differences in the surface speeds of the intermediate transfer belt 10, the secondary transfer roller 31, and the resist roller 41 correspond to fluctuations in the frequency band included in the control band for feedback control.

By performing feedback control with respect to each motor, the rotational speed of each motor may be reflected in the control of the rotating member control unit. In other words, a fluctuation in the driving torque of each motor may also be reflected in each signal upstream of each motor.

Thus, in the present embodiment, instead of using the drive torque Ta of the intermediate transfer motor 21, some other value supplied to the intermediate transfer motor 21, such as a current command value, a drive current, a measured PWM value, or a measured torque value is used. In other words, the current command value, the drive current, the measured PWM value, or the measured torque value that is supplied to the intermediate transfer motor 21 is used as the conveying force of the intermediate transfer motor 21.

Note that each of the above values that may be used as the conveying force of the intermediate transfer motor 21 in the present embodiment is proportional to the driving torque Ta.

Also, note that because each of the above values is used as the conveying force of the intermediate transfer motor 21, rotational speed control of the secondary transfer motor 32 and the registration motor 42 by the rotating member control unit according to the present embodiment may be performed in a manner similar to the first embodiment.

Figure 14:
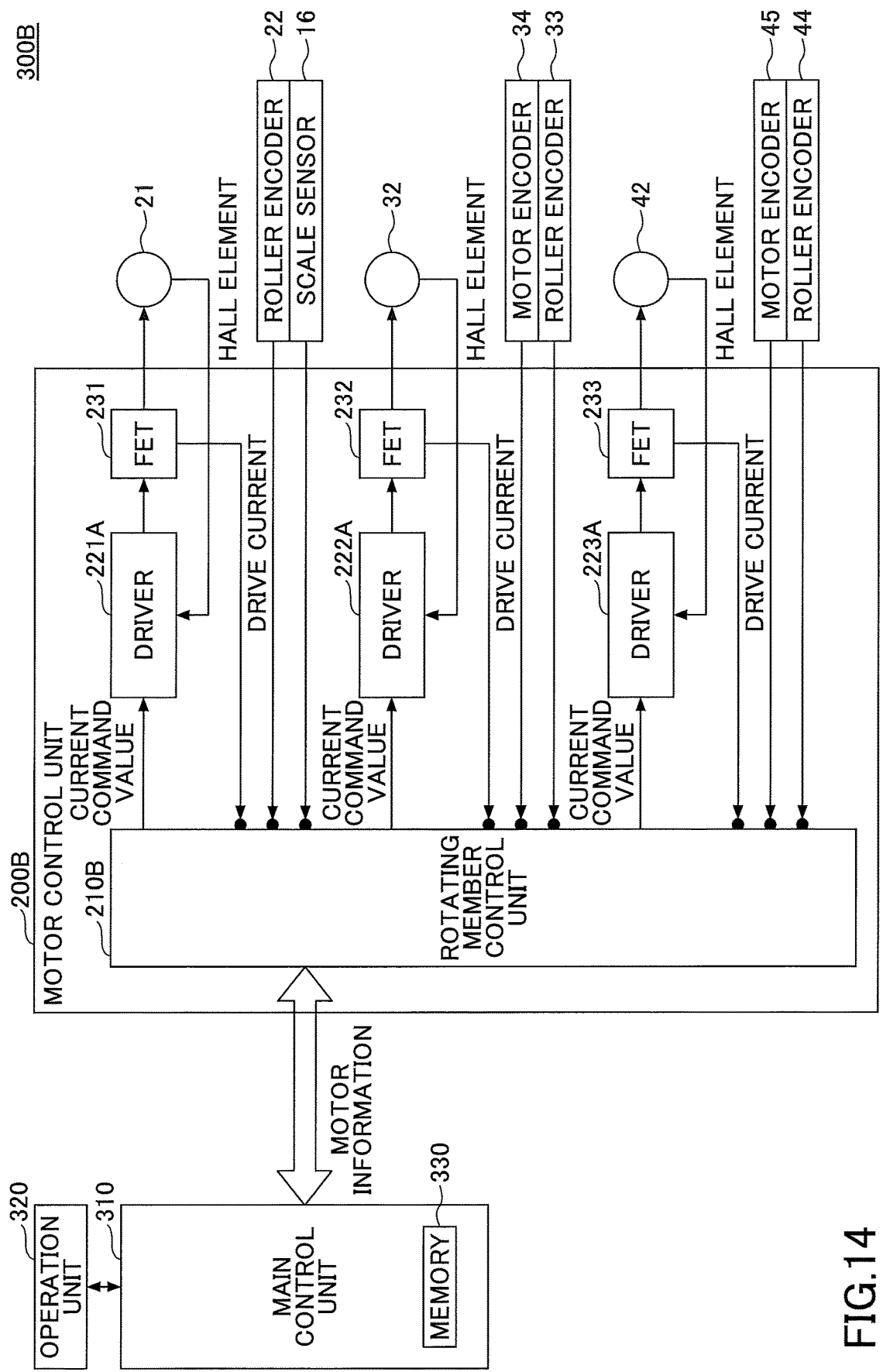
FIG. 14 is a diagram illustrating an example motor control unit according to a third embodiment of the present invention that uses a current command value.

FIG. 14 is a diagram illustrating a motor control unit 200B of an image forming apparatus 300B according to the present embodiment that uses a current command value. The motor control unit 200B of the image forming apparatus 300B of FIG. 14 includes a rotating member control unit 210B, drivers 221A, 222A, 223A, and FETs 231, 232, and 233.

The rotating member control unit 210B outputs to each driver a current command value indicating the current to be supplied to each motor.

The rotating member control unit 210B according to the present embodiment includes an acquiring unit that acquires the current command value, and the rotating, member control unit 210B uses the acquired current command value instead of the driving torque Ta of the intermediate transfer motor 21 to control the motors.

Figure 15:
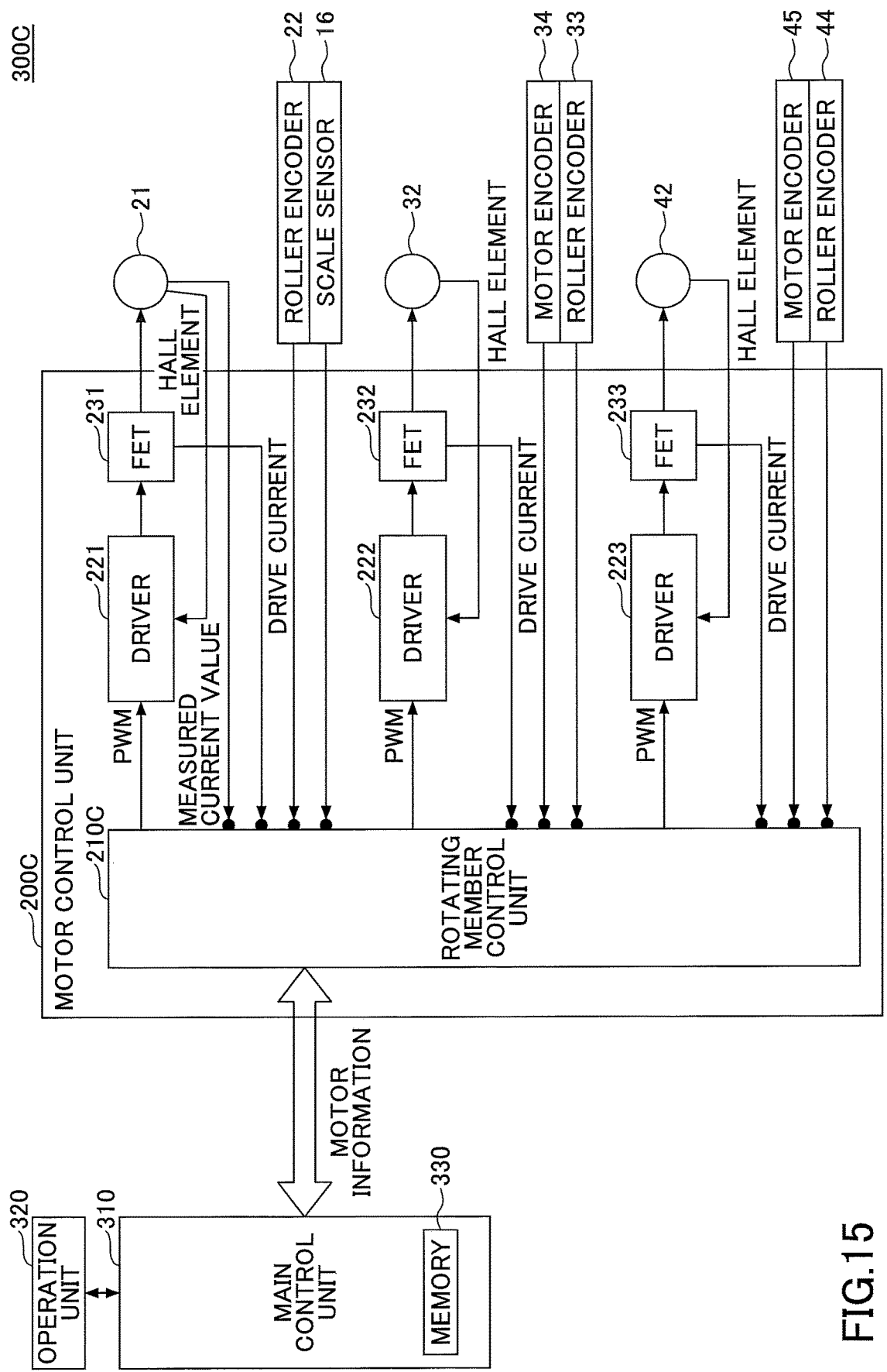
FIG. 15 is a diagram illustrating another example motor control unit according to the third embodiment that uses a measured current value.

FIG. 15 is a diagram illustrating a motor control unit 200C of an image forming apparatus 300C according to the present embodiment that uses a measured current value.

The motor control unit 200C of the image forming apparatus 300C of FIG. 15 includes a rotating member control unit 210C, drivers 221, 222, and 223, and FETs 231, 232, and 233.

The rotating member control unit 210C includes an acquiring unit that acquires a measured current value of a current flowing through the intermediate transfer motor 21 from a current detecting sensor that detects the current flowing through the intermediate transfer motor 21, and the rotating member control unit 210C uses the acquired measured current value instead of the driving torque Ta of the intermediate transfer motor 21 to control the motors.

Figure 16:
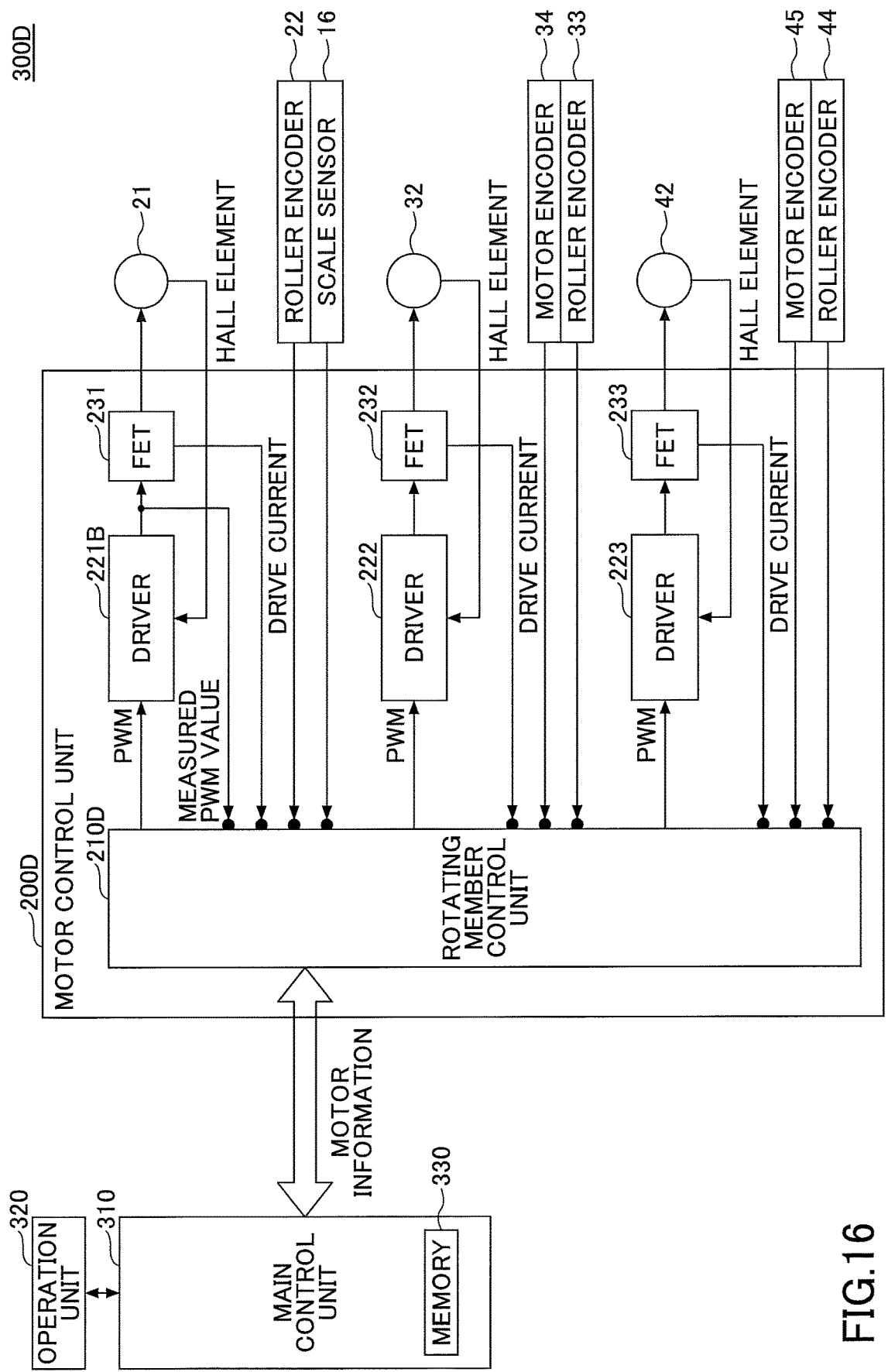
FIG. 16 is a diagram illustrating another example motor control unit according to the third embodiment that uses a measured PWM value.

FIG. 16 is a diagram illustrating a motor control unit 200D of an image forming apparatus 300D according to the present embodiment that estimates the driving torque based on a measured PWM value.

The motor control unit 200D of the image forming apparatus 300D of FIG. 16 includes a rotating member control unit 210D, drivers 221B, 222, and 223, and FETs 231, 232, and 233.

The driver 221B according to the present embodiment outputs to the rotating member control unit 210D the duty of a PWM signal generated based on a PWM command value supplied by the rotating member control unit 210D as the PWM measured value. More specifically, the driver 221B may include a clock counter, for example, and the duty of the PWM signal obtained based on the counted number of clock counts by the driver 221B may be output to the rotating member control unit 210D.

The rotating member control unit 210D includes an acquiring unit that acquires the measured PWM value, and the rotating member control unit 210D uses the acquired measured PWM value instead of the driving torque Ta of the intermediate transfer motor. 21 to control the motors.

Figure 17:
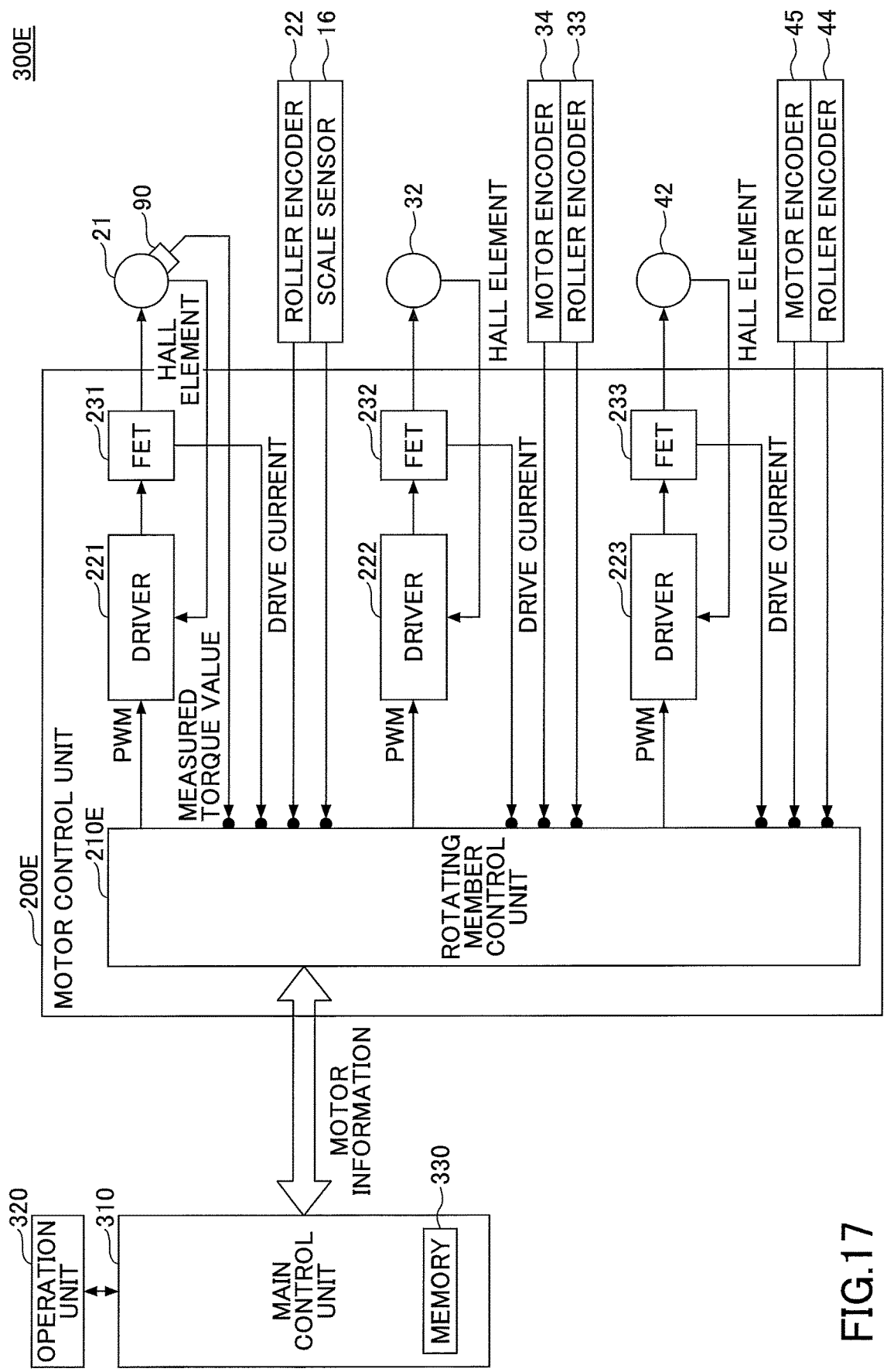
FIG. 17 is a diagram illustrating another example motor control unit according to the third embodiment that uses a measured torque value.

FIG. 17 is a diagram illustrating a motor control unit 200E of an image forming apparatus 300E according to the present embodiment that uses a measured torque value.

The motor control unit 200E of the image forming apparatus 300E of FIG. 17 includes a rotating member control unit 210E, drivers 221, 222, and 223, and FETs 231, 232, and 233.

In the image forming apparatus 300E, a torque meter 90 that measures the driving torque Ta of the intermediate transfer motor 21 is provided in the intermediate transfer motor 21. The torque meter 90 outputs the measured driving torque Ta to the rotating member control unit 210E.

The rotating member control unit 210E includes an acquiring unit that acquires the driving torque Ta measured by the torque meter 90. The rotating member control unit 210E uses the measured driving torque Ta acquired by the acquiring unit instead of the estimated value of the driving torque Ta of the intermediate transfer motor 21.

As described above, according to an aspect of the present embodiment, a value other than the estimated value of the driving torque Ta of the intermediate transfer motor 21 can be used, and in this way, calculation of the estimated value of the driving torque Ta may be unnecessary.

Fourth Embodiment

In the following, a fourth embodiment of the present invention will be described. A conveying device 400 according to the fourth embodiment has a configuration that differs from that of the conveying apparatus 100 according to the first through third embodiments of the present embodiment.

Figure 18:
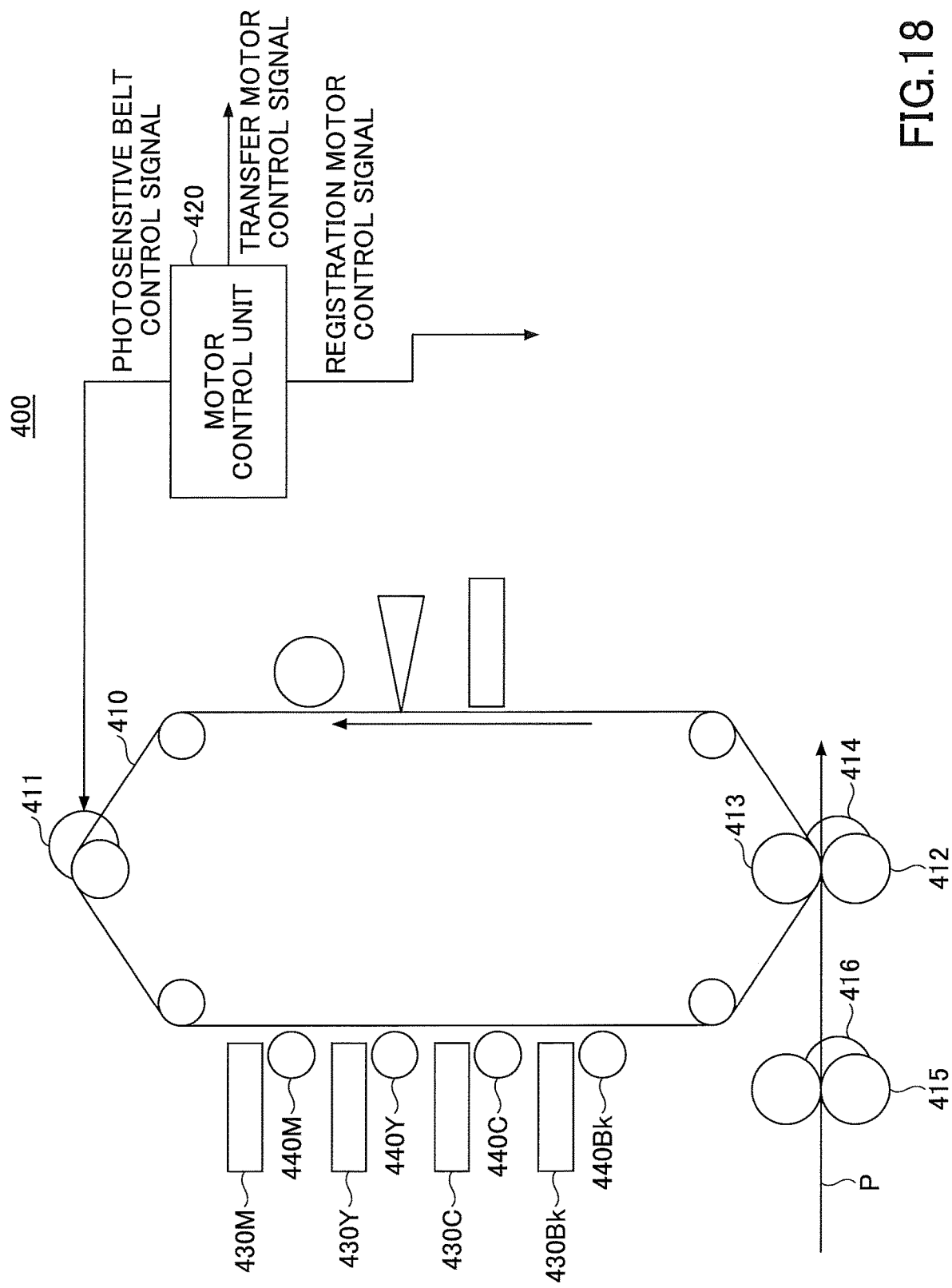
FIG. 18 is a diagram illustrating a conveying device according to a fourth embodiment of the present invention.

FIG. 18 is a diagram illustrating an example configuration of the conveying device 400 according to the fourth embodiment.

The conveying device 400 according to the present embodiment includes a photosensitive belt 410 and a motor control unit 420 that rotates the photosensitive belt 410.

The conveying device 400 according to the present embodiment further includes writing units 430C, 430M, 430Y, and 430Bk for forming a latent image with laser beams on the photoreceptor belt 410 that is electrostatically charged, and developing units 440C, 440M, 440Y, and 440Bk for developing the latent image with toner.

In the conveying device 400, a color image is formed on the photosensitive belt 410 by repeating latent image formation and image development the same number of times as the number of colors.

The photosensitive belt 410 is rotationally driven by a belt drive motor 411, and a color image is transferred onto a recording medium P between a transfer roller 412 and an opposing roller 413. The transfer roller 412 can be brought into contact with and separated from the photosensitive belt 410. Further, the recording medium P is conveyed by a registration roller 415 and the transfer roller 412.

The transfer roller 412 is rotated by a transfer motor 414. The registration roller 415 is rotated by a registration motor 416.

In the present embodiment, the belt driving motor 411 is controlled by a photosensitive belt control signal output by the motor control unit 420. Further, the transfer motor 414 is controlled by a transfer motor control signal output by the motor control unit 420. The registration motor 416 is controlled by a registration motor control signal output by the motor control unit 420.

The motor control unit 420 of the conveying device 400 according to the present embodiment controls the rotational speed of the transfer roller 412 such that the value of the photosensitive belt control signal supplied to the belt drive motor 411 when the photosensitive belt 410 and the transfer roller 412 are separated from each other and the value of the photosensitive belt control signal supplied to the belt driving motor 411 when the recording medium (sheet) P is in pressure contact with the photosensitive belt 410 and the transfer roller 412 would be equal.

Although the present invention has been described above with reference to certain illustrative embodiments, the present invention is not limited to these embodiments, and numerous variations and modifications may be made without departing from the scope of the present invention.

What is claimed is:

1. A rotating member control device configured to control a first rotating member and a second rotating member to convey a sheet, the rotating member control device comprising:
   a memory storing a program; and
   a processor configured to execute the program to implement processes of
   controlling the first rotating member and the second rotating member to come into contact or be separated from each other;
   acquiring a value that represents a driving torque of a first driving unit that rotationally drives the first rotating member, the value being acquired upon separation when the first rotating member and the second rotating member are separated from each other and upon conveyance when the sheet is held between the first rotating member and the second rotating member and is conveyed by the first rotating member and the second rotating member; and
   setting a rotational speed of the second rotating member such that the value acquired upon separation and the value acquired upon conveyance become equal,
   wherein
   the processor further controls a third rotating member, which is arranged upstream of a nip portion formed between the first rotating member and the second rotating member with respect to a conveying direction of the sheet and is configured to convey the sheet to the nip portion where the sheet is held between the first rotating member and the second rotating member;
   the processor further sets a rotational speed of the third rotating member such that the value acquired upon the separation or the conveyance, and a value acquired when the sheet is held by the first rotating member, the second rotating member and the third rerating member, become equal, and
   the processor further implements processes of
   acquiring a first driving torque value for a first conveying section in which the sheet is conveyed by the nip portion and the third rotating member;
   acquiring a second driving torque value for a second conveying section in which the sheet is conveyed by the nip portion;
   comparing the first driving torque value for the first conveying section and the second driving torque value for the second conveying section;
   setting the rotational speed of the third rotating member such that the first driving torque value for the first conveying section and the second driving torque value for the second conveying section become equal; and
   setting the rotational speed of the second rotating member such that the second driving torque value for the second conveying section and the value acquired upon separation become equal.

2. The rotating member control device according to claim 1, wherein the processor further implements processes of
   fixing the rotational speed of the second rotating member when conveying the sheet;
   changing the rotational speed of the third rotating member to increase when the first driving torque value for first conveying section is greater than the second driving torque value for the second conveying section;
   changing the rotational speed of the third rotating member to decrease when the first driving torque value for the first conveying section is less than the second driving torque value for the second conveying section; and
   conveying the sheet until an inequality between the first driving torque value for the first conveying section and the second driving torque value for the second conveying section is reversed.

3. The rotating member control device according to claim 2, wherein the processor further implements processes of
   obtaining a linear equation representing the rotational speed of the third rotating member based on the rotational speeds of the third rotating member before and after the inequality between the first driving torque value for the first conveying section and the second driving torque value for the second conveying section is reversed; and
   calculating, based on the linear equation, the rotational speed of the third rotating member at which the first driving torque value for the first conveying section and the second driving torque value for the second conveying section become equal.

4. The rotating member control device according to claim 3, wherein the processor further implements processes of
   changing the rotational speed of the second rotating member to increase when the second driving torque value for the second conveying section is greater than the driving torque value acquired upon separation;
   changing the rotational speed of the second rotating member to decrease when the second driving torque value for the second conveying section is less than the value acquired upon separation; and
   conveying the sheet until an inequality between the value acquired upon separation and the second driving torque value for the second conveying section is reversed.

5. The rotating member control device according to claim 4, wherein the processor further implements processes of
   obtaining a linear equation representing a ratio of the rotational speed of the second rotating member to the rotational speed of the third rotating member based on the rotational speeds of the second rotating member before and after the inequality between the value acquired upon separation and the second driving torque value for the second conveying section is reversed and the rotational speeds of the third rotating member before and after the inequality between the first driving torque value for the first conveying section and the second driving torque value for the second conveying section is reversed.

6. The rotating member control device according to claim 5, wherein the processor further implements processes of
   calculating, based on the linear equation indicating the ratio, the rotational speed of the second rotating member and the rotational speed of the third rotating member at which the value acquired upon separation, the value for the first conveying section, and the second driving torque value for the second conveying section become equal.

7. The rotating member control device according to claim 1, wherein the processor further implements processes of
   obtaining a linear equation representing the rotational speed of the second rotating member based on the rotational speeds of the second rotating member before and after an inequality between the value acquired upon separation and the value acquired upon conveyance is reversed; and
   calculating, based on the linear equation, the rotational speed of the second rotating member at which the value acquired upon separation and the value acquired upon conveyance become equal.

8. The rotating member control device according to claim 1, wherein
the value that represents the driving torque of the first driving unit is at least one of a driving current of the first driving unit, a current command value supplied to the first driving unit, and a PWM command value supplied to the first driving unit.

9. The rotating member control device according to claim 1, wherein
the processor calculates the value of the driving torque based on a PWM command value output to the first driving unit and a surface speed of the first rotating member detected at the first rotating member.

10. The rotating member control device according to claim 1, wherein
the processor calculates the value of the driving torque based on a driving current supplied to the first driving unit and a surface speed of the first rotating member detected at the first rotating member.

11. A conveying device for conveying a sheet, the conveying device comprising:
a first rotating member;
a second rotating member; and
a rotating member control device that is configured to
control the first rotating member and the second rotating member to come into contact or be separated from each other;
acquire a value that represents a driving torque of a first driving unit that rotationally drives the first rotating member, the value being acquired upon separation when the first rotating member and the second rotating member are separated from each other and upon conveyance when the sheet is held between the first rotating member and the second rotating member and is conveyed by the first rotating member and the second rotating member; and
set a rotational speed of the second rotating member such that the value acquired upon separation and the value acquired upon conveyance become equal,
wherein
the rotating member control device is further configured to:
control a third rotating member, which is arranged upstream of a nip portion formed between the first rotating member and the second rotating member with respect to a conveying direction of the sheet and is configured to convey the sheet to the nip portion where the sheet is held between the first rotating member and the second rotating member;
set a rotational speed of the third rotating member such that the value acquired upon the separation or the conveyance, and a value acquired when the sheet is held by the first rotating member, the second rotating member and the third rerating member, become equal,
the rotating member control device
acquire a first driving torque value for a first conveying section in which the sheet is conveyed by the nip portion and the third rotating member;
acquire a second driving torque value for a second conveying section in which the sheet is conveyed by the nip portion;
compare the first driving torque value for the first conveying section and the second driving torque value for the second conveying section;
set the rotational speed of the third rotating member such that the first driving torque value for the first conveying section and the second driving torque value for the second conveying section become equal; and
set the rotational speed of the second rotating member such that the second driving torque value for the second conveying section and the value acquired upon separation become equal.

12. An image forming apparatus comprising:
a conveying device for conveying a sheet, the conveying device including a first rotating member, a second rotating member, and a rotating member control device;
wherein the rotating member control device is configured to
control the first rotating member and the second rotating member to come into contact or be separated from each other;
acquire a value that represents a driving torque of a first driving unit that rotationally drives the first rotating member, the value being acquired upon separation when the first rotating member and the second rotating member are separated from each other and upon conveyance when the sheet is held between the first rotating member and the second rotating member and is conveyed by the first rotating member and the second rotating member; and
set a rotational speed of the second rotating member such that the value acquired upon separation and the value acquired upon conveyance become equal,
wherein
the rotating member control device is further configured to:
control a third rotating member, which is arranged upstream of a nip portion formed between the first rotating member and the second rotating member with respect to a conveying direction of the sheet and is configured to convey the sheet to the nip portion where the sheet is held between the first rotating member and the second rotating member;
set a rotational speed of the third rotating member such that the value acquired upon the separation or the conveyance, and a value acquired when the sheet is held by the first rotating member, the second rotating member and the third rerating member, become equal,
the rotating member control device
acquire a first driving torque value for a first conveying section in which the sheet is conveyed by the nip portion and the third rotating member;
acquire a second driving torque value for a second conveying section in which the sheet is conveyed by the nip portion;
compare the first driving torque value for the first conveying section and the second driving torque value for the second conveying section;
set the rotational speed of the third rotating member such that the first driving torque value for the first conveying section and the second driving torque value for the second conveying section become equal; and
set the rotational speed of the second rotating member such that the second driving torque value for the second conveying section and the value acquired upon separation become equal.

* * * * *